(12) United States Patent
Frederickson et al.

(10) Patent No.: US 12,018,810 B2
(45) Date of Patent: Jun. 25, 2024

(54) CROSSBAR WITH LIGHTING

(71) Applicant: Rivian IP Holdings, LLC, Irvine, CA (US)

(72) Inventors: Austin Frederickson, Carlsbad, CA (US); Joshua Bayer, Costa Mesa, CA (US); Christian V. Elder, Irvine, CA (US); Paula Michelle Lobaccaro, San Clemente, CA (US); Zechariah John Rudnicki, Holt, MI (US); Erik Robert Glaser, San Mateo, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/942,953

(22) Filed: Sep. 12, 2022

(65) Prior Publication Data

US 2024/0011617 A1   Jan. 11, 2024

Related U.S. Application Data

(60) Provisional application No. 63/359,757, filed on Jul. 8, 2022.

(51) Int. Cl.
*F21S 43/14* (2018.01)
*F21W 103/20* (2018.01)
*F21W 103/35* (2018.01)

(52) U.S. Cl.
CPC .......... *F21S 43/14* (2018.01); *F21W 2103/20* (2018.01); *F21W 2103/35* (2018.01)

(58) Field of Classification Search
CPC .............................. H05B 47/165; B60Q 1/2611
See application file for complete search history.

(56) References Cited

U.S. PATENT DOCUMENTS

| | | | |
|---|---|---|---|
| 5,195,816 A | 3/1993 | Moss et al. | |
| 8,322,902 B2 | 12/2012 | Martin et al. | |
| 8,577,556 B1 | 11/2013 | Noel | |
| 8,789,991 B2 | 7/2014 | Martin et al. | |
| 9,121,566 B2 | 9/2015 | De Lamberterie | |
| 9,758,088 B1* | 9/2017 | Salter | B60Q 1/0035 |
| 10,859,229 B1* | 12/2020 | Elwell | F21S 43/15 |
| 2009/0161377 A1* | 6/2009 | Helms | B60Q 1/0483 |
| | | | 362/493 |
| 2010/0110708 A1* | 5/2010 | Lyons | B60Q 1/2615 |
| | | | 362/543 |
| 2011/0181185 A1* | 7/2011 | Day | B60Q 1/326 |
| | | | 315/77 |

(Continued)

FOREIGN PATENT DOCUMENTS

| | | |
|---|---|---|
| EP | 2161494 A1 | 3/2010 |
| EP | 2792940 A2 | 10/2014 |
| EP | 2098774 B1 | 7/2020 |

OTHER PUBLICATIONS

U.S. Appl. No. 17/943,002, filed Sep. 12, 2022, Austin Frederickson.

*Primary Examiner* — Eric T Eide
(74) *Attorney, Agent, or Firm* — HALEY GUILIANO LLP

(57) ABSTRACT

Particular embodiments may provide a crossbar with a plurality of light sources and a controller. The controller may be configured to: determine a sequence of a vehicle and, in response to determining the sequence, cause a light source of the plurality of light sources to perform an action.

21 Claims, 32 Drawing Sheets

(56) References Cited

U.S. PATENT DOCUMENTS

| | | | |
|---|---|---|---|
| 2012/0049556 A1* | 3/2012 | Barnes | B60H 1/00514 |
| | | | 165/41 |
| 2015/0138803 A1* | 5/2015 | Salter | B60Q 1/2661 |
| | | | 362/510 |
| 2015/0266411 A1* | 9/2015 | Bennie | B60Q 1/2611 |
| | | | 701/36 |
| 2017/0327030 A1 | 11/2017 | Kim et al. | |
| 2018/0099610 A1* | 4/2018 | Meyers | F21V 19/003 |
| 2020/0198561 A1* | 6/2020 | Weed | B60R 16/0231 |
| 2020/0406812 A1* | 12/2020 | Molines | H05B 47/18 |

\* cited by examiner

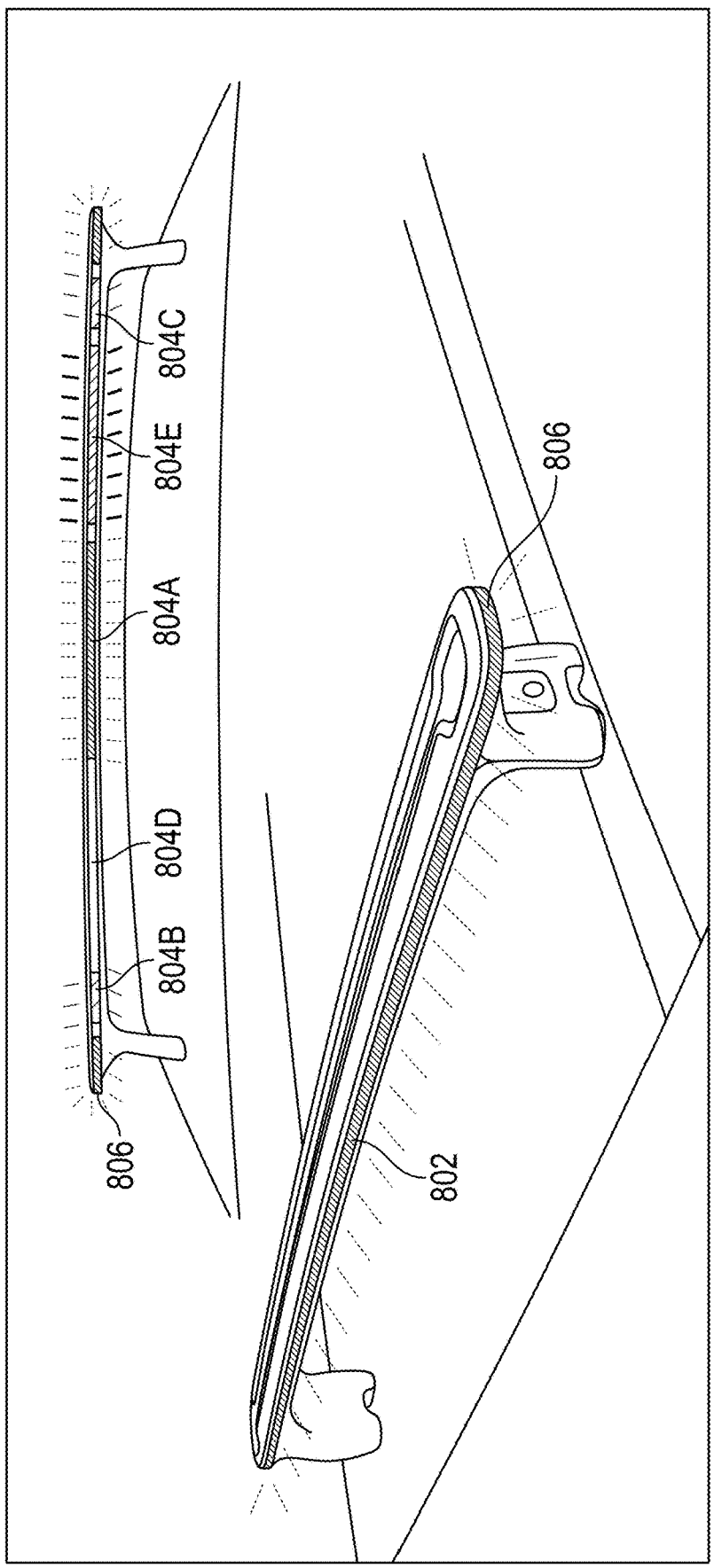

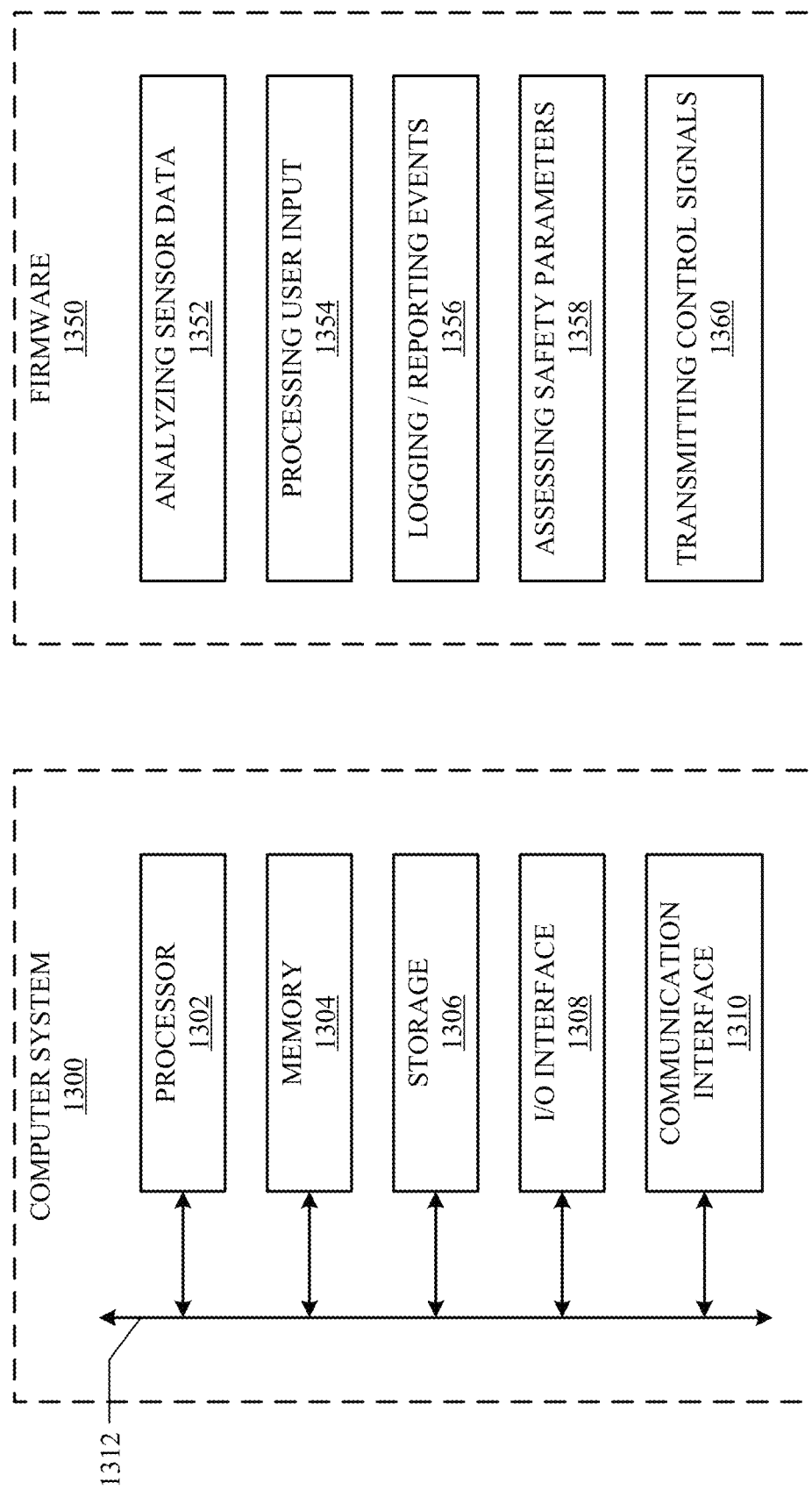

CROSSBAR WITH LIGHTING

CROSS-REFERENCE TO RELATED APPLICATIONS

This application claims the benefit of U.S. Provisional Application No. 63/359,757, filed Jul. 8, 2022, the entirety of which is incorporated by reference herein.

INTRODUCTION

Vehicle mounting bars are on many passenger cars, sports utility vehicles (SUVs), and trucks. Popular among adventure enthusiasts, mounting bars conveniently carry larger items that do not fit in the vehicle's cargo area, such as bikes, canoes and kayaks, skis and snowboards, surfboards, camping gear, etc. In addition to carrying larger items, mounting bars also greatly expand a vehicle's carrying capacity.

BRIEF SUMMARY

While providing cargo carrying advantages, traditional crossbars are limited in their functionality. Disclosed herein are crossbars that advantageously include light sources to, for example, illuminate scenes in front of, alongside, or behind a vehicle. Crossbars disclosed herein provide, in some embodiments, a plurality of light sources. In some further, embodiments, a light source of the plurality of light sources performs an action (e.g., a light generation action) in response to a determined sequence. For example, in response to determining a vehicle turn sequence, light sources at the end of the crossbar are caused to perform yellow light generation actions to signal the vehicle turn.

In some embodiments, an apparatus includes: a crossbar including a plurality of light sources; and a controller configured to: determine a sequence of a vehicle; and in response to determining the sequence, cause at least one light source of the plurality of light sources to perform an action.

The sequence, in some embodiments of the apparatus, includes a vehicle braking sequence, and the controller is configured to: in response to determining the vehicle braking sequence, cause a first light source on a back side of the crossbar to generate a first light (e.g., red light) and cause a second light source on a front side of the crossbar to generate a second light (e.g., white light, red light, flashing light).

In some embodiments of the apparatus, the sequence includes a vehicle turn sequence, and the controller is configured to: in response to determining the vehicle turn sequence, cause at least one light source on a lateral end of the crossbar to generate a periodic/pulsing third light (e.g., yellow light).

The crossbar includes, in some embodiments of the apparatus, an accessory insertion port and the sequence includes an accessory insertion sequence, and the controller is configured to: in response to determining the accessory insertion sequence, cause a light source of the plurality of light sources to generate a light, where the light source is associated with the accessory insertion port.

In some embodiments, the sequence includes a chase sequence, and the controller is configured to: in response to determining the chase sequence, cause a first light source of the plurality of light sources to generate a first light (e.g., a white light) and cause second and third light sources of the plurality of light sources to generate a second light (e.g., a yellow light, yellow and red lights), where the first light source is positioned between the second and third light sources.

The sequence includes, in some embodiments, a vehicle unlock sequence, and the controller is configured to: in response to determining the vehicle unlock sequence, cause a first light source of the plurality of light sources to generate a first light (e.g., a white light) and subsequently cause second and third sources of the plurality of light sources to generate a second light (e.g., white light, white and red lights), where the first light source is positioned between the second and third light sources.

In some embodiments of the apparatus, the sequence includes a follow sequence, and the controller is configured to: in response to determining the follow sequence, cause a first light source on the back side of the crossbar to generate a first light (e.g., yellow light) and cause second and third light sources on the back side of the crossbar to generate a second light (e.g., a yellow light, yellow and red lights), where the first light source is positioned between the second and third light sources.

The sequence includes, in some embodiments of the apparatus, a lock sequence, and the controller is configured to: in response to determining the lock sequence, cause light sources on the back side of the crossbar to generate a light at a first intensity and subsequently cause the light sources on the back side of the crossbar to generate a light at a second intensity, the first intensity greater than the second intensity.

In some embodiments of the apparatus, the plurality of light sources include a forward facing light source, a rear facing light source, a lateral end light source, and a bottom surface light source.

The crossbar includes, in some embodiments of the apparatus, an electrical connection. In some embodiments, the crossbar includes a mount for coupling the crossbar to a vehicle. In some embodiments, the crossbar includes an electrical connection and a mount for coupling the crossbar to a vehicle, wherein the electrical connection is in the mount. The crossbar includes, in some embodiments, an aluminum extrusion.

In some embodiments, the apparatus includes a user interface configured to receive a user-originated sequence, and determining the sequence includes determining the user-originated sequence.

The controller is, in some embodiments of the apparatus, configured to: in response to determining the sequence, determine whether the sequence is restricted; in response to determining the sequence is not restricted, permit causing the light source from the plurality of light sources to perform the action; in response to determining the sequence is restricted and a restriction criteria is met, permit causing the light source from the plurality of light sources to perform the action; and in response to determining the sequence is restricted and a restriction criteria is not met, forgo causing the light source from the plurality of light sources to perform the action.

In some embodiments, a computer-readable non-transitory storage media embodying software including instructions operable when executed to perform operations including: determine a sequence of a vehicle; in response to determining the sequence, send signals to cause a crossbar light source to perform an action.

In some embodiments of the medium, determining the sequence of the vehicle includes determining a user-originated sequence.

The operations, in some embodiments of the medium, include: in response to determining the sequence, determine whether the sequence is restricted; in response to determining the sequence is not restricted, permit causing the crossbar light source to perform the action; in response to determining the sequence is restricted and a restriction criteria is met, permit causing the crossbar light source to perform the action; and in response to determining the sequence is restricted and a restriction criteria is not met, forgo causing the crossbar light source to perform the action.

In some embodiments, a vehicle includes: a crossbar mounted to the vehicle, the crossbar including a plurality of light sources; and a control system including processors and a memory including instructions executable by the processor, the processor operable to execute the instructions to perform operations including: determine a sequence of a vehicle; and in response to determining the sequence, send signals to cause a crossbar light source to perform an action.

The crossbar includes, in some embodiments of the vehicle, a top surface and a bottom surface, where the plurality of light sources include light sources positioned in the bottom surface, and where the light sources positioned in the bottom surface are configured to illuminate a non-vehicle area.

In embodiments of the vehicle, the crossbar is configured to support a load when mounted on the vehicle.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, an apparatus, a system, and/or a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 8A-8G illustrate an example action performed by a light source of a crossbar.
FIG. 13A is a schematic of an example computer system.
FIG. 13B illustrates example firmware for a vehicle electronic control unit (ECU).

DETAILED DESCRIPTION

Figure 1:
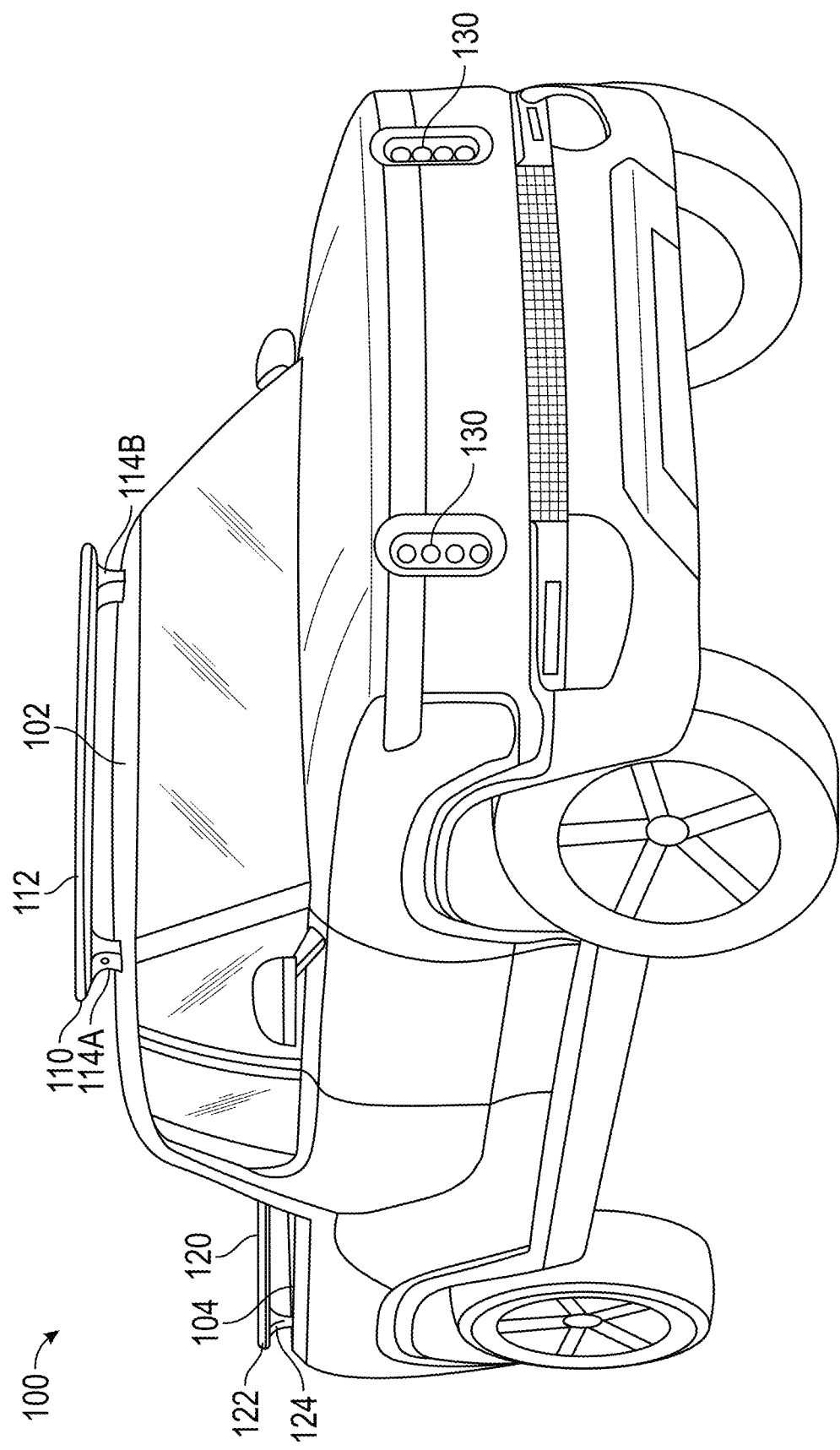
FIG. 1 illustrates an example truck with crossbars.

FIG. 1 illustrates an example truck 100 with crossbars 110 and 120. Crossbar 110 is mounted on a roof 102 of truck 100 via mounts 114A and 114B and crossbar 120 is mounted on a truck bed side panel 104 of truck 100 via mount 124 (an additional mount, not shown, may mount crossbar 120 to an opposite truck bed side panel, not shown). Crossbar 110 and crossbar 120 includes a plurality of light sources (112 and 122, respectively). Crossbars 110 and 120 are, in some embodiments, configured to support a load. As used herein, a crossbar is configured to support a load when the crossbar (alone or in combination with another crossbar) is rated to support 220lbs. In some embodiments, the departure light source is integrated into the crossbar. In others, the departure light source is separate from the crossbar and is connected to the crossbar (or to the vehicle) as described further herein.

A controller is configured to cause a light source of the plurality of light sources to perform an action. As used herein, a light source can be understood to perform an action when it changes state in response to a signal. By way of illustration, an action can include generating light (e.g., white light, red light, yellow light, blue light, green light, etc.), stopping light generation (e.g., switching off a light source that was generating light before the action), and changing a light color (e.g., switching an activated white light to a red light, switching an activated yellow light to a white light). In some embodiments, the controller is configured for controlling light sources individually (e.g., activating/deactivating light sources independently, changing the color of light sources independently). The controller, in some embodiments, causes multiple light sources to perform actions to coordinate the multiple light sources in generating lighting patterns (e.g., animation). Light generation includes, for example, continuous illumination and periodic illumination (such as flashing or blinking or pulsing), light of a single color, changing color, or combined colors, and light of constant or varying intensity.

In some embodiments, the controller is configured to determine a vehicle sequence and, in response to determining the vehicle sequence, cause the light source of the plurality of light sources to perform an action. As used herein, a vehicle sequence can be understood to correspond to a step or steps in a vehicle process. A vehicle sequence is, in some embodiments, initiated by a user activated instruction, for example a user pressing on a brake pedal, a user activating a turn signal, a user locking/unlocking a vehicle with a remote key, and a user interacting with a user interface. A vehicle sequence can, in some embodiments, be independent of the crossbar. For example, a vehicle ECU determines a sequence for vehicle braking (for example, a regenerative braking system) and does so whether the vehicle has an associated crossbar; when a crossbar disclosed herein is added to vehicle, a controller determines (by monitoring the corresponding ECU and/or by receiving a signal from the ECU) the vehicle braking sequence and, in response to determining the vehicle braking sequence, causes a light source of the plurality of light sources to perform a red light generation action (see, e.g., FIGS. 5A-5C). In some embodiments, a vehicle sequence is dependent on a crossbar. For example, a controller may determine an accessory is inserted into an accessory insertion port of the crossbar and, in response, cause a light source associated with the insertion port to perform a light generation action (see, e.g., FIGS. 9A-9G). The controller can, in embodiments, cause a light source to perform more than one action in response to a vehicle sequence. For example, a controller determines that an auto-pilot system is about to slow the vehicle and cause the vehicle to make a turn and, in response to determining this vehicle sequence, the crossbar controller causes a light source to perform a red light generation action (see. e.g., FIGS. 5A-5C) and a light source to perform a yellow light generation action (see. e.g., FIGS. 7A-7C). In some embodiments, determining a vehicle sequence includes determining that all steps in the vehicle sequence have been performed. In other embodiments, determining a vehicle sequence includes determining less than all steps in the vehicle sequence have been performed. For example, determining a vehicle sequence may include determining that an initiation step for a vehicle sequence has been performed.

A controller can directly or indirectly "cause" a light source to perform an action. For example, the controller can be associated with the crossbar (for example, installed in the crossbar or added to the vehicle) and can be associated with the vehicle (e.g., installed in the vehicle for non-crossbar functions) (exemplary vehicle controllers are disclosed below with respect to FIG. 11). In some embodiments, a controller that determines the sequence of the vehicle may send a signal to another controller (e.g., one that directly communicates with the crossbar light sources) to cause the light source to take an action. In such instances, multiple controllers work together to form a single controller that determines the vehicle sequence and, in response to determining the sequence, cause a light source of the plurality of light sources to perform an action.

Figure 2:
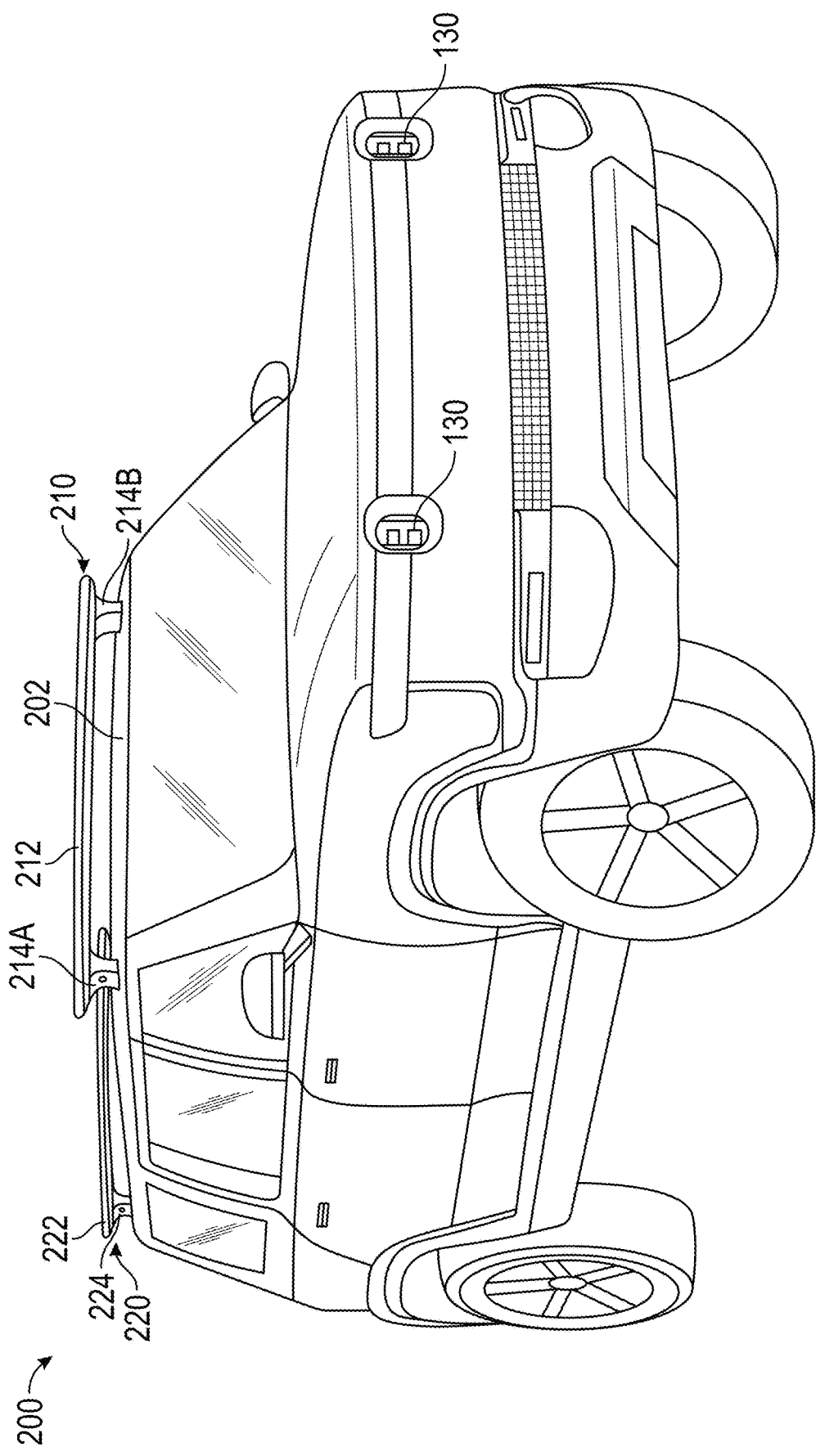
FIG. 2 illustrates an example SUV with crossbars.

FIG. 2 illustrates an example SUV with crossbars 210 and 220. Similar to crossbars 110 and 120 illustrated in FIG. 1, crossbars 210 and 220 include light sources 212 and 222 and mounts 214A, 214B, and 224. Crossbars 210 and 220 are mounted to roof 202 of SUV 200.

The vehicles in FIGS. 1 and 2 are exemplary. Although this application illustrates crossbars on a truck and an SUV, it should be appreciated that the crossbars described herein are not limited by the type of vehicle on which the crossbar is mounted. For example, crossbars could be mounted to passenger vehicles, delivery vehicles, tractors, camping vans, etc. Further, unless expressly described, crossbars herein are not limited by the position on which they are mounted to a vehicle. For example, although FIGS. 1 and 2 illustrate the crossbars mounted to the roof of a vehicle and the bed of a vehicle, crossbars could be mounted in the interior of a vehicle, mounted on the outer surface of a windshield or other glass, mounted to the top of a driver's side doorframe, mounted to the vehicle's hood, etc.

Figure 3A:
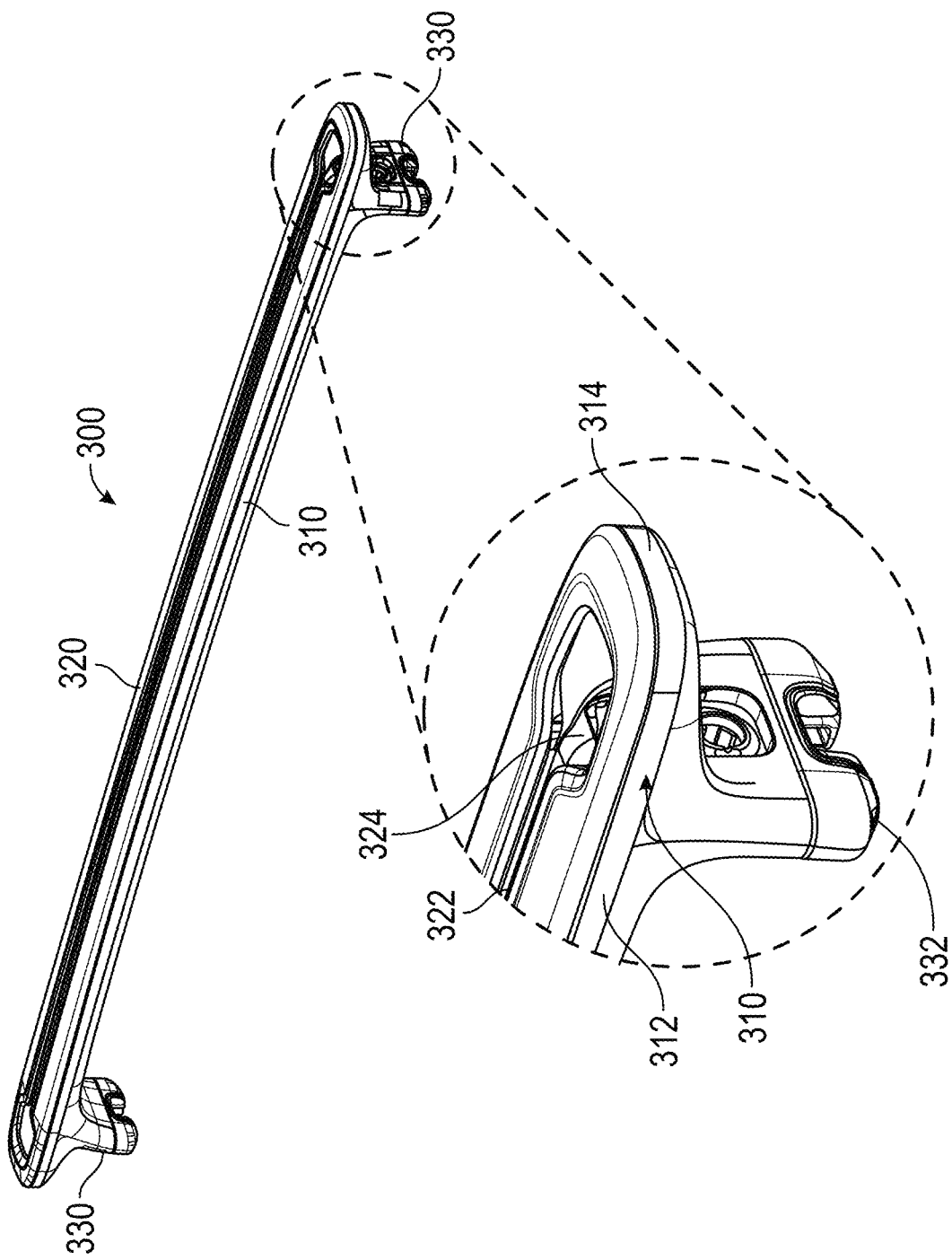
FIG. 3A illustrates an example crossbar with a plurality of light sources.

FIG. 3A illustrates an example crossbar 300 with a plurality of light sources 310, a top surface 320, and mounts 330. Crossbar 300 is, in some embodiments, crossbar 110, crossbar 120, crossbar 210, or crossbar 220 described above.

Light sources 310 include a plurality of light sources configured to illuminate non-vehicle areas around the vehicle. Light sources 310 include front side light sources 312 and lateral end light sources 314. In some embodiments, crossbar 300 includes back side light sources (not shown in FIG. 3) and bottom surface light sources (not shown in FIG. 3). As used herein, the "front" and "back" of the crossbar refers to opposite sides of crossbar. When mounted to a vehicle, the "front" side of the crossbar refers to a forward facing direction of the vehicle (i.e., a "Drive" direction of the vehicle) and the "back" side of crossbar refers to rear facing direction of the vehicle (i.e., a "Reverse" direction of the vehicle). In some embodiments, a crossbar is configured to be mounted in a certain orientation so that one side is pre-designated as the forward facing side of the crossbar and the other side is pre-designed as the rear facing side of the crossbar. In some embodiments, the crossbar is not pre-configured to be mounted in a designated orientation. In such embodiments, the crossbar can, once mounted, be user programmed to designate one side as "front" and the other side as "back." In some embodiments, the crossbar may automatically detect its orientation with respect to the vehicle and automatically designate one side as "front" and the other side as "back."

In some embodiments, the forward facing light sources include bright white light emitting diodes (LEDs). In these embodiments, the high brightness white illumination can augment the light produced by low beam or high beam headlamps on the vehicle.

Crossbar 300 also includes lateral end light sources 314. As used herein, light sources at a lateral end of a crossbar can be understood to include light sources which are positioned in the transition from the front side light sources to the back side light sources. Additional lateral end light sources are identified below with respect to FIGS. 6A-9G. Lateral end light sources can augment a vehicle's turn signals and hazard signals. Lateral end light sources and nearby front side light sources can, in some embodiments, be used as cornering lamps to augment light coming from the vehicle. In some embodiments, lights 334 (see FIG. 3B) are used as cornering lamps. In such embodiments, bottom surface lights 334 are pointed down and in front of the vehicle. Traditional vehicles have insufficient illumination on the front corners of the vehicle, which impairs visibility during turns, especially tight turns at low speeds over uneven terrain. Lateral end light sources (or bottom surface lights 334), especially high brightness light sources, can address these deficiencies. In some embodiments, the cornering light is activated by a controller. For example, a controller can monitor vehicle parameters (e.g., vehicle speed, steering angle, overall vehicle tilt, etc.) and, in response to determining a vehicle cornering or turning sequence, cause a light source at a lateral end (or on a bottom surface) of a crossbar to perform a light generation action. The light source could be activated at either end of the crossbar to assist in cornering at the respective sides of the vehicle.

The plurality of light sources 310 are, in some embodiments, individually adjustable. To that end, the light sources can be individual light sources, such as LEDs. Individually adjustable light sources could also include a backlit panel with individually controllable pixels (e.g., similar to a liquid crystal display). Crossbar 300 includes RGBW capabilities visible from all sides of the vehicle. In embodiments where individual light sources are separately controlled, the 3600 lighting advantageously allows for a significant variety of illumination patterns. Such animations can include (but are not limited to) welcome animations, side indicator extensions, follow me functionality, color identification for trail use, or auxiliary bed illumination.

In some embodiments, a peripheral surface with light sources continuously encircles the crossbar. The peripheral surface lies between a top surface (e.g., top surface 320 of crossbar 300) configured to support cargo and a bottom surface with mounts (e.g, mounts 330 of crossbar 300) configured to attach to a vehicle.

Figure 3B:
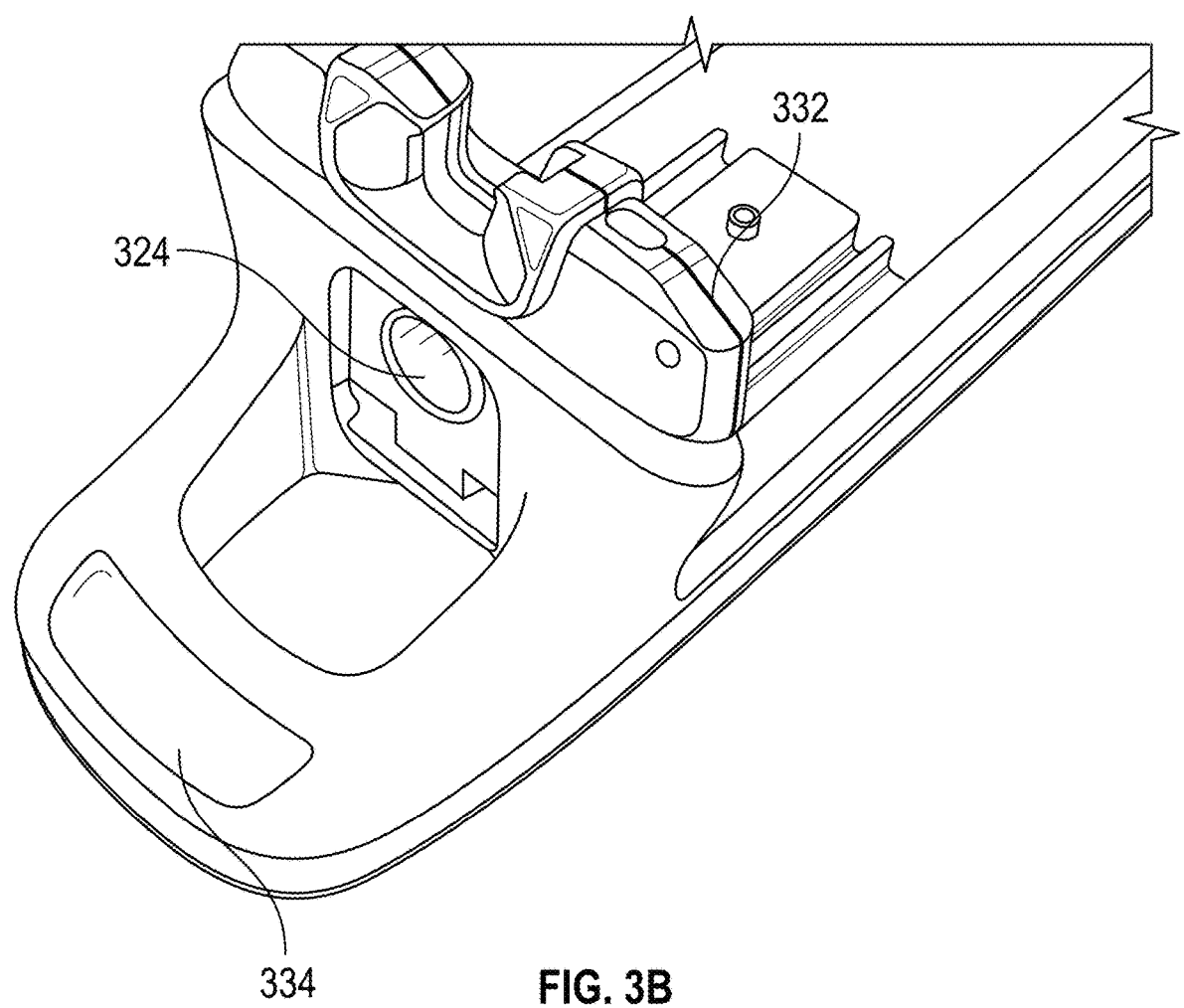
FIG. 3B illustrates another view of the crossbar in FIG. 3A.

Some embodiments include task lighting positioned in a bottom surface of the crossbar. Exemplary task lights 334 are depicted in FIG. 3B. A bottom surface light source can be understood to include a light source that is positioned on a surface opposite the crossbar surface configured to support a load. In an embodiment where the crossbar is mounted to a top of a vehicle, the bottom surface is proximal the vehicle and the top surface is distal. For example, the bottom surface light sources in the crossbars of FIGS. 1 and 2 would be positioned on the same side of the crossbar as the mounts. The bottom surface light sources are positioned to illuminate a non-vehicle area alongside the vehicle. In some embodiments, a controller causes the bottom surface light surfaces to perform actions in response to the controller determining a vehicle sequence. For example, when a controller determines a door open sequence, the controller can, in some embodiments, cause a bottom surface light source to perform a light generation action to illuminate the vehicle area proximate to the door. Similarly, if a controller determines a door close sequence, the controller can cause a bottom surface light source to stop light generation. In some embodiments, the bottom surface light sources provide flood lamps. These may assist stationary activities, such as campsite illumination, task illumination, or any other general purpose illumination that assists a user at a side of the vehicle. In some embodiments, a position of the user is monitored by a radar or a Near-Field Communication (NFC) of the vehicle and light sources of the plurality of light sources are illuminated such that the task lighting follows the user. In some embodiments, bottom surface lights 334 are used for cornering, as described herein.

Crossbar 300 includes top surface 320 configured to support a load. Top surface 320 includes channel 322 for fixing cargo to the crossbar. In some embodiments, channel 322 provides a power source for accessories. Top surface 320 also includes an accessory insertion port 324. Accessory insertion port 324 can be used to attach gear cables (see, e.g., FIGS. 9A-9G) and other accessories, but can also provide a power outlet.

Crossbar 300 includes mounts 330 configured to attach to a vehicle. The mounts are positioned on a surface of the crossbar opposite the top surface 320. As shown in FIGS. 1 and 2, a mount can be attached to a vehicle on an exterior of the vehicle, such as to a roof of a vehicle (e.g., attached to roof 102 of vehicle 100 or roof 202 of vehicle 200) or a truck bed of a vehicle (e.g., attached to truck bed side panel 104 of vehicle 100). In other embodiments, the crossbar is attached to an interior of the vehicle. Mounts can attach the crossbar to the vehicle using any suitable means, including mechanical (e.g., bolts, clips), magnetic, suction, etc.

In some embodiments, crossbar 300 includes an electrical connection that is coupled to the light source. The electrical connection can receive power, data, and control signals from the vehicle; data transmission and control signals can be used to operate the crossbar light sources or operate other accessories. In crossbar 300, mounts 330 include electrical connections 332 that physically connect to the vehicle. In some embodiments, the electrical connection is not physically connected to the vehicle. For example, power can be provided to crossbar 300 through a battery source (e.g., a battery compartment in the crossbar) and data transmission/control is via a wireless connection (for example, Bluetooth, Wi-Fi, NFC, etc.). In some embodiments, USB ports are used for the crossbar's electrical connection.

Figure 4:
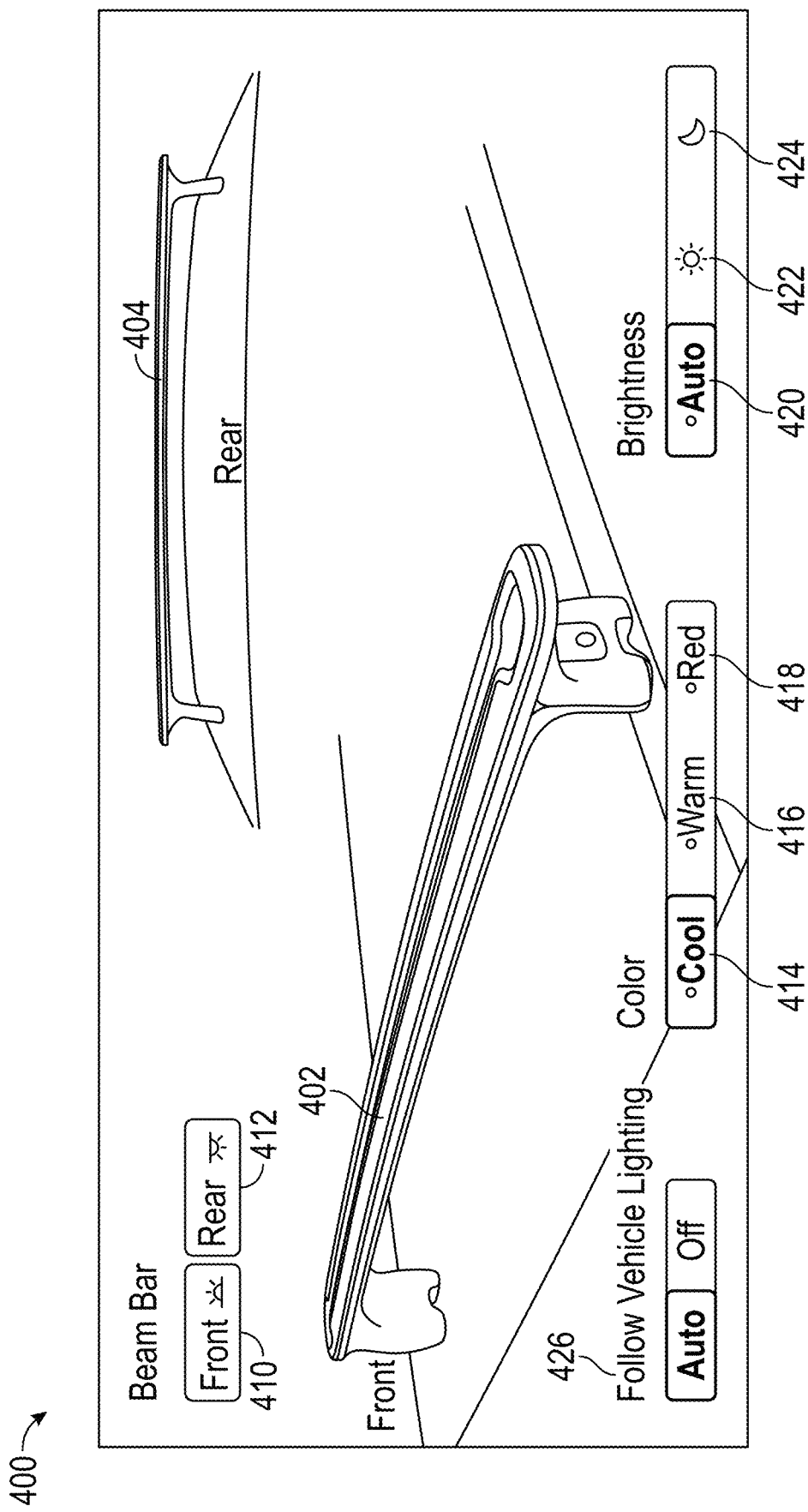
FIG. 4 illustrates an example user interface for controlling a crossbar with a plurality of light sources.

FIG. 4 illustrates an example user interface 400 for controlling a crossbar that includes a plurality of light sources. User interface 400 can be presented on a vehicle interface, a smart device, or any interface that provides a user with the ability to control the crossbar lighting. User interface 400 includes a representation 402 of the crossbar when it is viewed from the front of a vehicle and a representation 404 of the crossbar when it is viewed from the rear of the vehicle. User interface 400 provides a user with the ability to initiate a light generation action at the front of the crossbar (button 410), to initiate a light generation action at the back of the crossbar (button 412), to change a color generated by a light source of the crossbar (buttons 414, 416, and 418), and change an intensity of light generated by a light source of the crossbar (buttons 420, 422, and 424). When a user selects a change to the crossbar on the user interface, a controller (e.g., an Experience Management Module (XMM) ECU), determines a vehicle sequence is originated by the user. In response to determining the vehicle sequence, the controller causes a light source of the plurality of light sources to perform an action.

In some embodiments, the crossbar is a single crossbar, such as that shown in the user interface of FIG. 4. In other embodiments, the crossbar could be multiple bars—for example one at the front and rear of the vehicle, as shown in FIGS. 1 and 2. With multiple crossbars, the light source actions of the multiple crossbars can be coordinated. Taking a vehicle braking sequence (see FIGS. 5A-5C below) as an example, a first light source in a front side of the front crossbar could be controlled to perform a white light generation action and a second light source in a back side of the rear crossbar could be controlled to perform a red light generation action.

In some embodiments, the controller is configured to restrict actions by a mode or state of the vehicle. For example, a user may be restricted from selecting a vehicle sequence on user interface 400 unless the vehicle is a parked mode. In some embodiments, the controller is further configured to, in response to determining the sequence, determine whether the sequence is restricted. The controller may determine a sequence is restricted by accessing a stored list of restricted sequences. In response to determining the sequence is not restricted, the controller is configured to permit causing the light source from the plurality of light sources to perform the action. In some embodiments the controller is configure to, in response to determining the sequence is restricted and a restriction criteria is met, permit causing the light source from the plurality of light sources to perform the action. In some embodiments, the controller is configured to in response to determining the sequence is restricted and a restriction criteria is not met, forgo causing the light source from the plurality of light sources to perform the action. Restricted sequences may include light sources actions that are restricted to the vehicle being in a parked mode or an off-road mode, for example. For example, in some embodiments, a sequence (e.g., a follow sequence discussed below) is restricted to "off-road" mode. When a controller determines a follow sequence, the controller can, in some embodiments, determine whether the restriction criteria is met (in this example, the restriction criteria is that the vehicle is in "off-road" mode) and, if the vehicle is in off-road mode, permit the associated light generation action(s). If the vehicle is not off-road, the controller may forgo causing the associated light generation action(s).

User interface 400 includes "follow-vehicle" button 424. In a follow vehicle mode, vehicles in a convoy can use a crossbar to provide visual communication between a leader and the remainder of the convoy. A controller can cause the crossbar to perform a follow vehicle sequence when, for example, other vehicles in the convoy have fallen a set distance behind the convoy leader. In embodiments with a follow sequence, the controller can determine a follow sequence by identifying that a distance between vehicles has exceeded a threshold. In other embodiments, a following vehicle can communicate (e.g., via a Telematics Control Module (TCM) ECU) with a leader of the convoy when ambient light conditions limit visual communication between the vehicles (in some such embodiments, the vehicle may communicate with other vehicles in the convoy using, for example, through a TCM ECU). The controller can be configured to, in response to determining the follow sequence, cause a first light source on the back side of the crossbar to perform a yellow light generation action and cause second and third light sources on the back side of the crossbar to subsequently perform yellow light generation actions, where the first light source is positioned between the second and third light sources.

The vehicle sequence is, in some embodiments, a braking sequence and the action includes a white light generation action on the front side of the crossbar and a red light generation on a back side of the crossbar. In embodiments where the sequence comprises a vehicle braking sequence, the controller can be configured to, in response to determining the vehicle braking sequence, cause a first light source on a back side of the crossbar to perform a red light generation action and cause a second light source on a front side of the crossbar to perform a white light generation action.

Figure 5A:
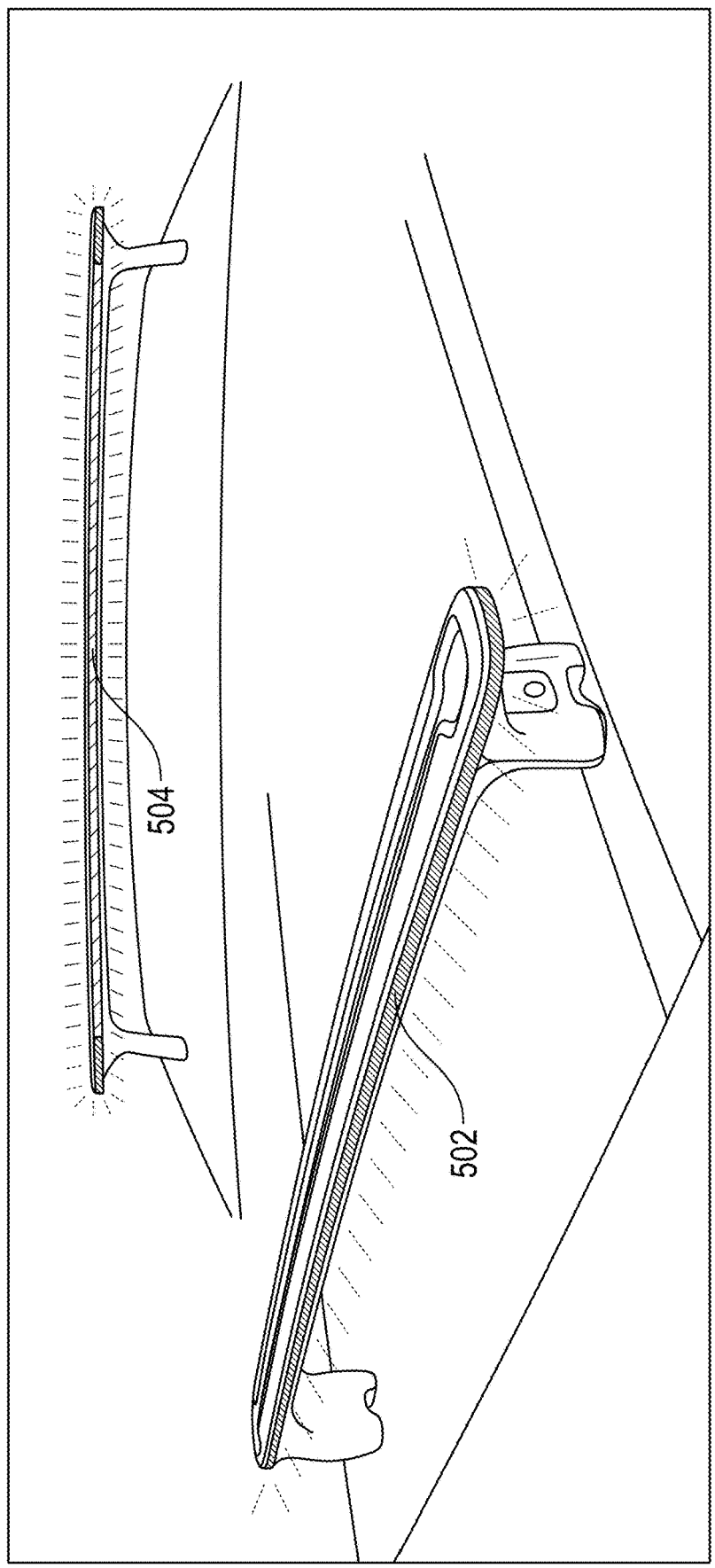
FIGS. 5A-5C illustrate an example action performed by a light source of a crossbar.
Figure 5B:
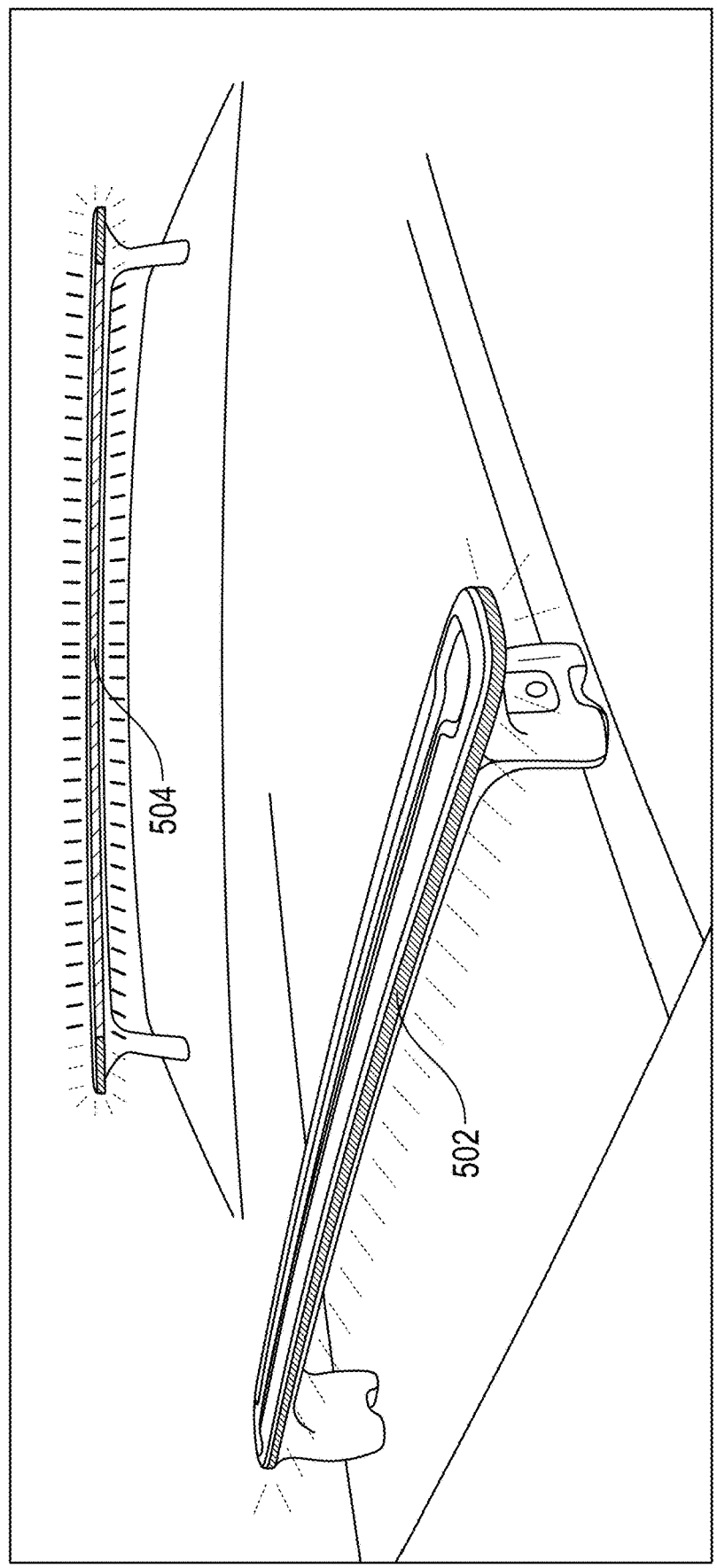
Figure 5C:
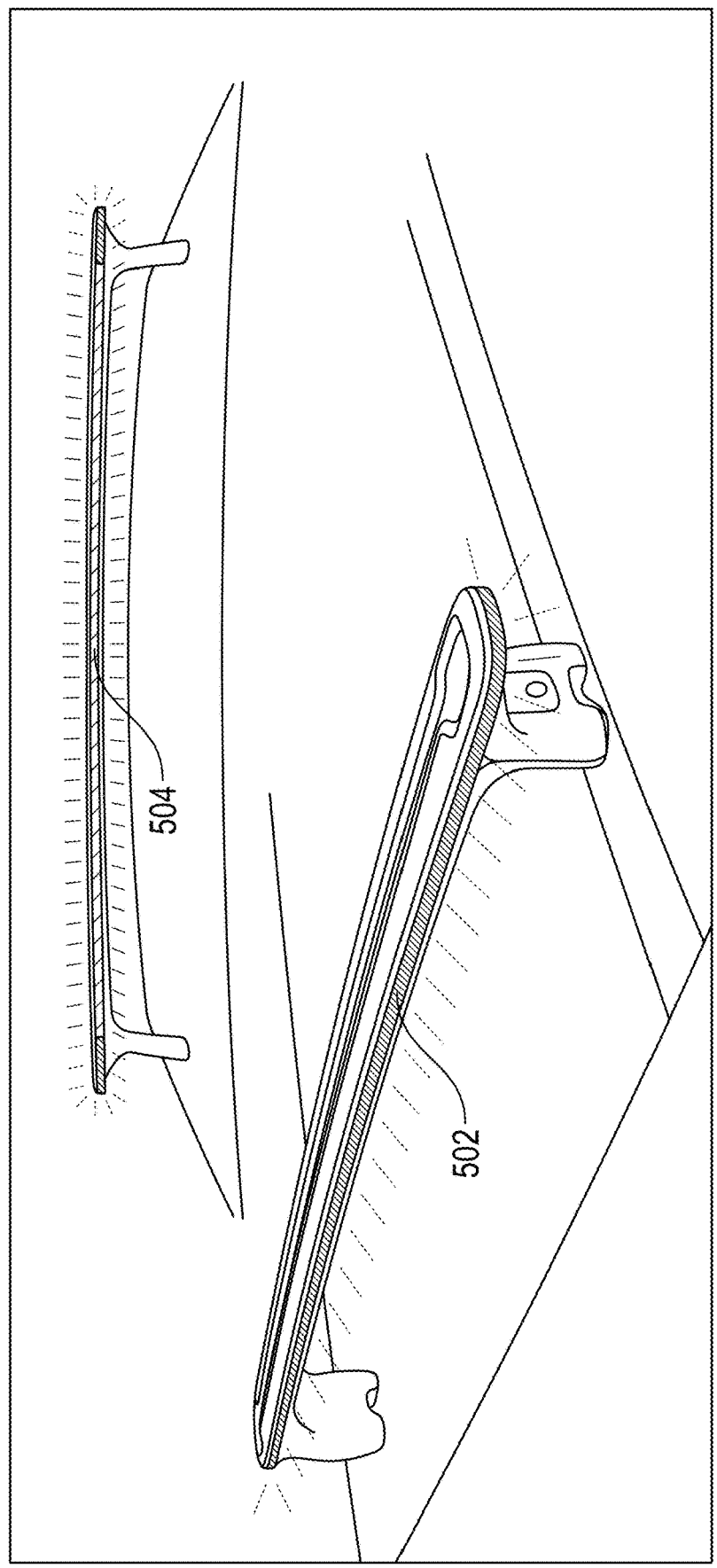

FIGS. 5A-5C illustrate an example action performed by a light source of a crossbar in response to a controller determining a vehicle braking sequence. FIGS. 5A-5C illustrate front side light sources 502 and back side light sources 504. As shown in FIG. 5A, front side light sources 502 perform a white light generation action and back side light sources 504 perform a red light generation action. In some embodiments, back side lights sources 504 perform a white light generation action or a flashing light generation action. In this arrangement, the vehicle may be operating in a normal operation mode (e.g., no vehicle sequences have been determined). FIG. 5B illustrates the front side light sources 502 and back side light sources 504 performing actions in response to a braking sequence. In FIG. 5B, front side light sources 502 have not changed, but back side light sources 504 have performed a red light generation action, namely the intensity of the light has increased (compared to the intensity of the light generation depicted in FIG. 5A). FIG. 5C illustrates the front side light sources 502 and back side light sources 504 after the braking sequence has ended. The braking sequence may have ended when, for example, a brake pedal in the vehicle was released. In the embodiment of FIG. 5C, the front side light sources 502 again did not change, but the back side light sources 504 performed a red light generation action, namely the intensity of the light has decreased from the intensity in FIG. 5B.

In some embodiments, a controller determines a vehicle braking sequence by determining a brake pedal is activated (for example, through a Body Control Module (BCM) ECU), by determining an autopilot system is slowing the vehicle (for example, through an Autonomy Control Module (ACM) ECU), by determining a regenerative braking system is slowing the vehicle (for example, through a Vehicle Dynamics Module (VDM) ECU), or by determining a brake light is activated (for example, through a Rear Zone Control (RZC) ECU controlling a trailer braking lights, rear stop lights or through a BCM ECU controlling rear stop lamps). A controller determines a braking sequence has ended when, for example, a brake pedal is released, an autopilot system stops slowing the vehicle, a regenerative braking system stops slowing the vehicle, a brake light is deactivated, a time has elapsed since the vehicle sequence was determined, or a controller (e.g., through a VDM ECU, through a Central Gateway Module (CGM) ECU) determines a return to a normal mode. In response to determining a braking sequence has ended, a controller can, for example, stop causing a light source to perform an action, cause the light source to perform the light generation actions in place before the controller determined the braking sequence, or cause the light source to perform light generation actions associated with a mode of the vehicle (for example, the normal mode depicted in FIG. 5A).

The vehicle sequence is, in some embodiments, a vehicle unlock sequence and the action includes a first light source of the plurality of light sources performing a white light generation action and second and third sources of the plurality of light sources subsequently performing white light generation actions, wherein the first light source is positioned between the second and third light sources. In embodiments where the sequence comprises a vehicle unlock sequence, the controller is configured to, in response to determining the vehicle unlock sequence, cause a first light source of the plurality of light sources to perform a white light generation action and subsequently cause second and third sources of the plurality of light sources to perform white light generation actions, wherein the first light source is positioned between the second and third light sources. In some embodiments, adjacent light sources to the second and third light sources of the plurality of light sources continue to perform white light generation actions. In some embodiments, the light sources continue generating white light in this pattern until the crossbar is illuminated 360 degrees. In some embodiments, a light source at the back side of the crossbar performs a red light generation action, after the white light generation action is performed at the back side.

Figure 6A:
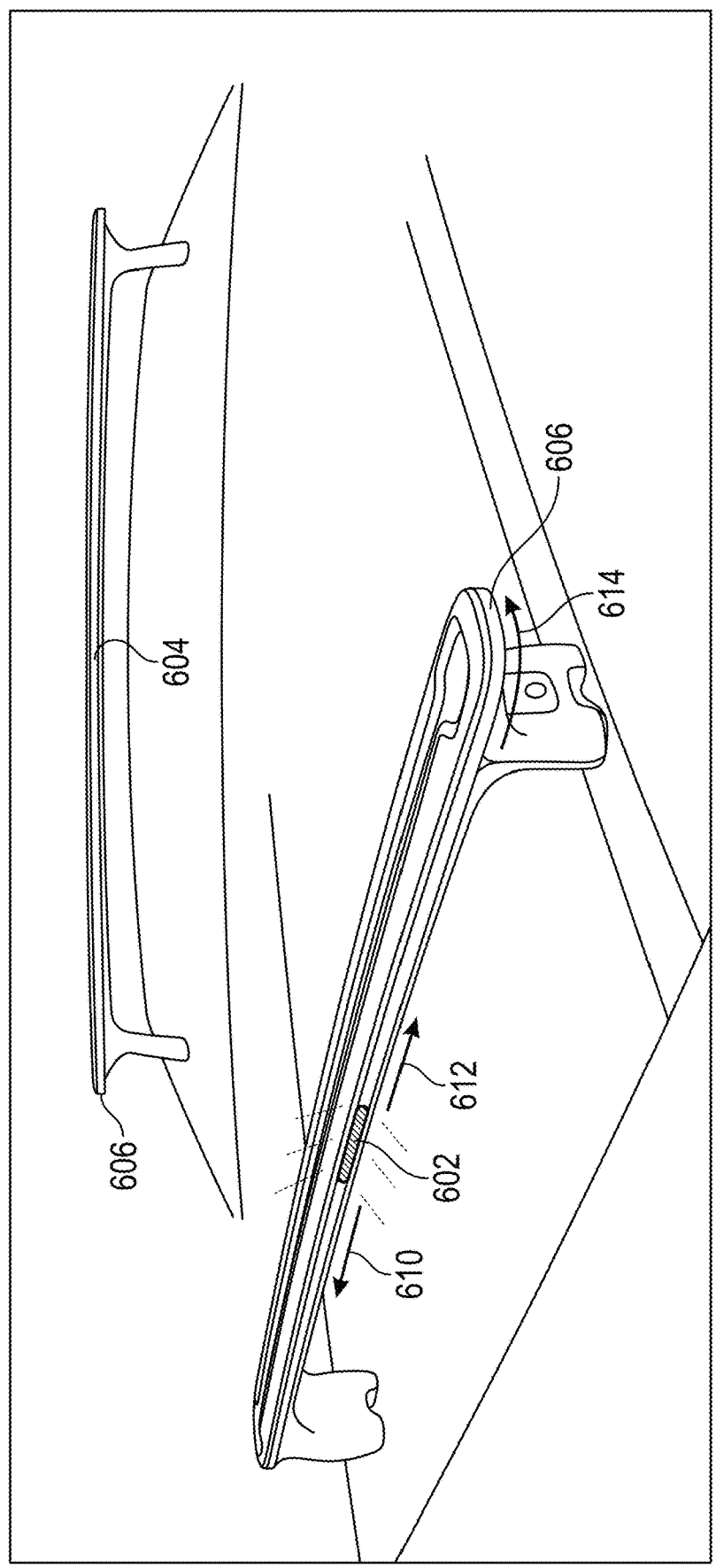
FIGS. 6A-6C illustrate an example action performed by a light source of a crossbar.
Figure 6B:
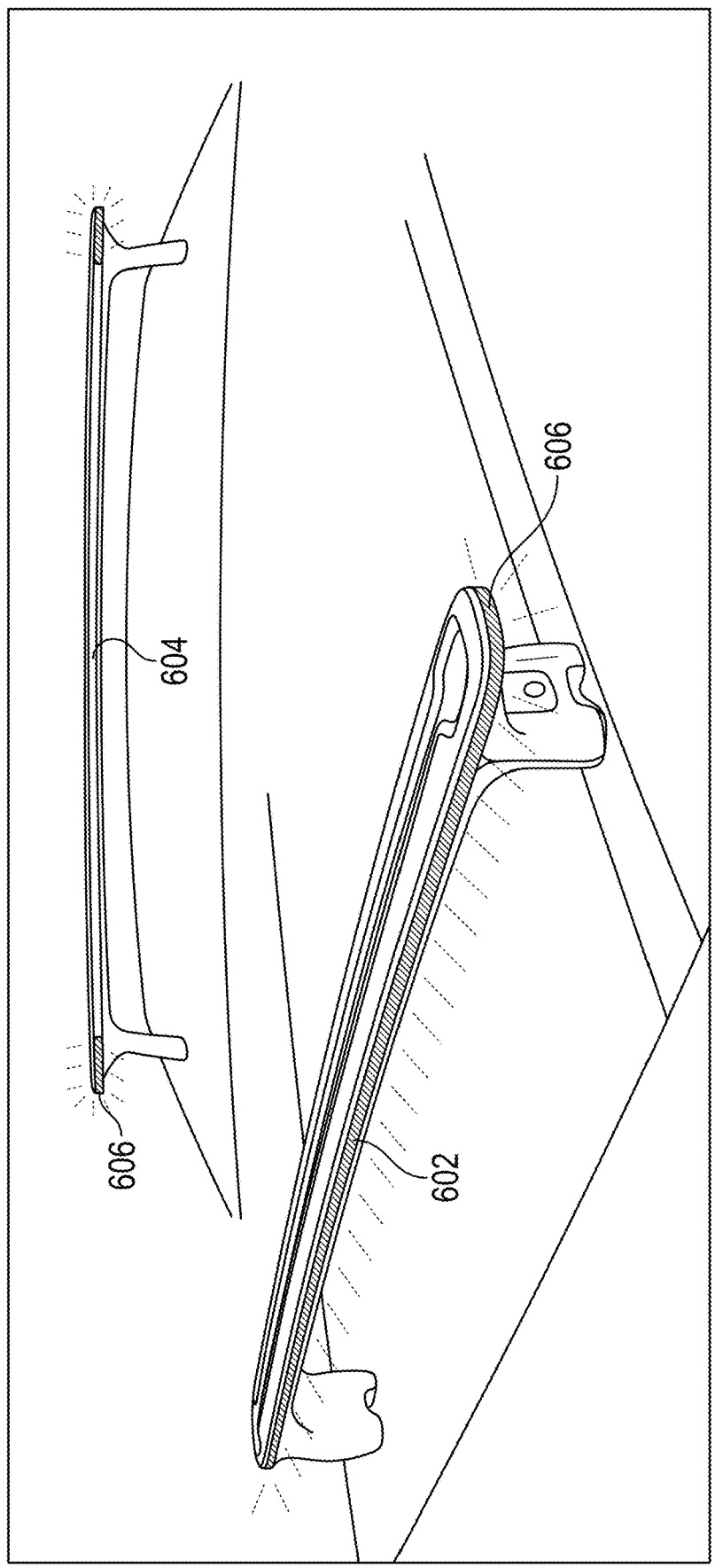
Figure 6C:
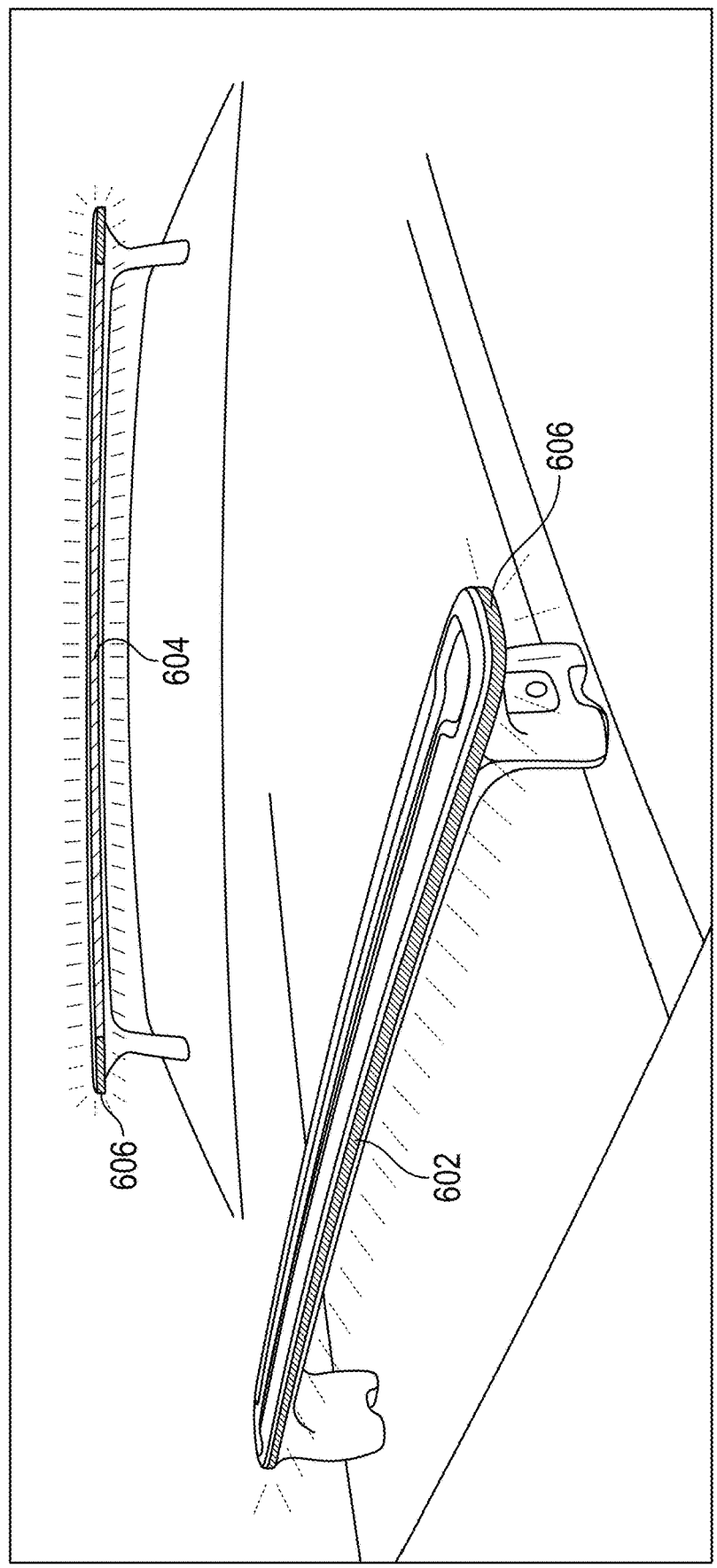

FIGS. 6A-6C illustrate an example action performed by a light source of a crossbar in response to a controller determining a vehicle unlock sequence. FIGS. 6A-6C illustrate front side light sources 602, back side light sources 604, and lateral end light sources 606.

As shown in FIG. 6A, a light source of the front side light sources 602 performs a white light generation action and then adjacent light sources in the front side light sources 602 perform white light generation actions. In the example illustrated in FIG. 6A, white light generation begins at the middle of the front side of the crossbar and then spreads out in both directions. Front side light sources, in the direction of arrows 610 and 612, perform white light generation actions, until lateral end light sources 606 perform white light generation actions, and then the white light generation action continues to light sources around the lateral end in the direction of 614. FIG. 6B illustrates the crossbar after the white light generation action has continued around the crossbar, i.e., the front side light sources 602 and lateral end light sources 606 perform white light generation actions.

Next, as shown in FIG. 6C, back side light sources 604 perform a red light generation action.

The vehicle sequence is, in some embodiments, a vehicle lock sequence and the action includes light sources on the back side of the crossbar performing a light generation action at a first intensity, the light sources on the back side of the crossbar subsequently performing a light generation action at a second intensity, the first intensity greater than the second intensity. In embodiments where the sequence comprises a vehicle lock sequence, the controller is configured to, in response to determining the lock sequence, cause light sources on the back side of the crossbar to perform a light generation action at a first intensity, subsequently cause the light sources on the back side of the crossbar to perform a light generation action at a second intensity, the first intensity greater than the second intensity.

In some embodiments, the unlock/lock sequences are initiated by a user operating a key (e.g., a button on a wireless key, key turning in a vehicle lock), a user operating an interface (e.g., a user interface on a smart device provides a lock/unlock button), and/or proximity of a user to the vehicle (e.g., a wireless key approaches/recedes from the vehicle, a paired smart device approaches/recedes from the vehicle). In such embodiments, a controller determines a vehicle unlock/lock sequence through a Vehicle Access System (VAS) ECU and/or a Door Control Module (DCM) ECU. A controller determines a vehicle unlock/lock sequence has ended when, for example, a user has entered/departed a vehicle, a time has elapsed since the vehicle sequence was determined, or a controller (e.g., a VDM ECU, a CGM ECU) determines a return to a normal mode. In response to determining a vehicle unlock sequence has ended, a controller can, for example, stop causing a light source to perform an action, cause the light source to perform the light generation actions in place before the controller determined the vehicle unlock sequence, or cause the light source to perform light generation actions associated with a mode of the vehicle (for example, the normal mode depicted in FIG. 5A).

The vehicle sequence is, in some embodiments, a vehicle turn sequence and the action includes a yellow light generation action performed by a light source at a lateral end of the crossbar. In embodiments where the sequence comprises a vehicle turn sequence, the controller can be configured to, in response to determining the vehicle turn sequence, cause a light source on a lateral end of the crossbar to perform a periodic/pulsing yellow light generation action.

Figure 7A:
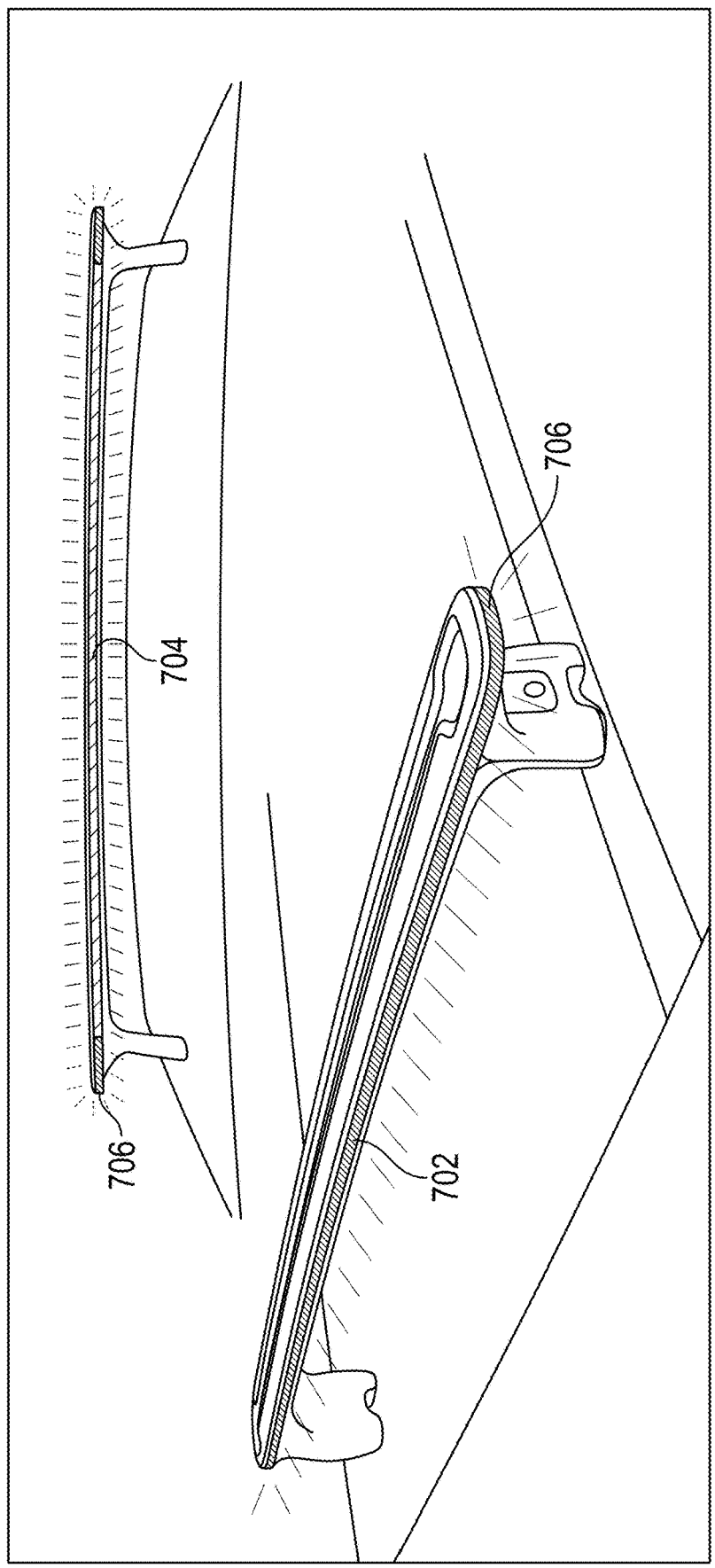
FIGS. 7A-7C illustrate an example action performed by a light source of a crossbar.
Figure 7B:
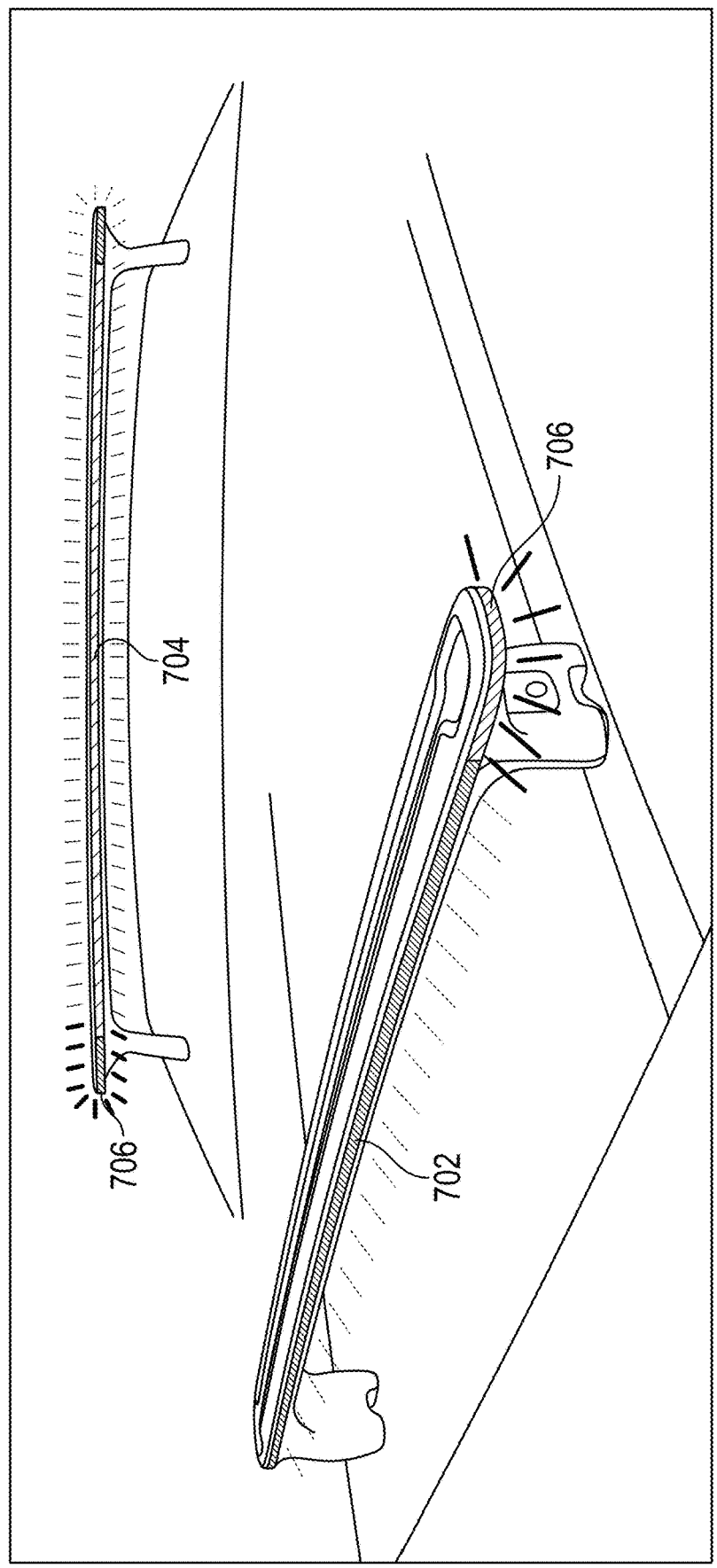
Figure 7C:
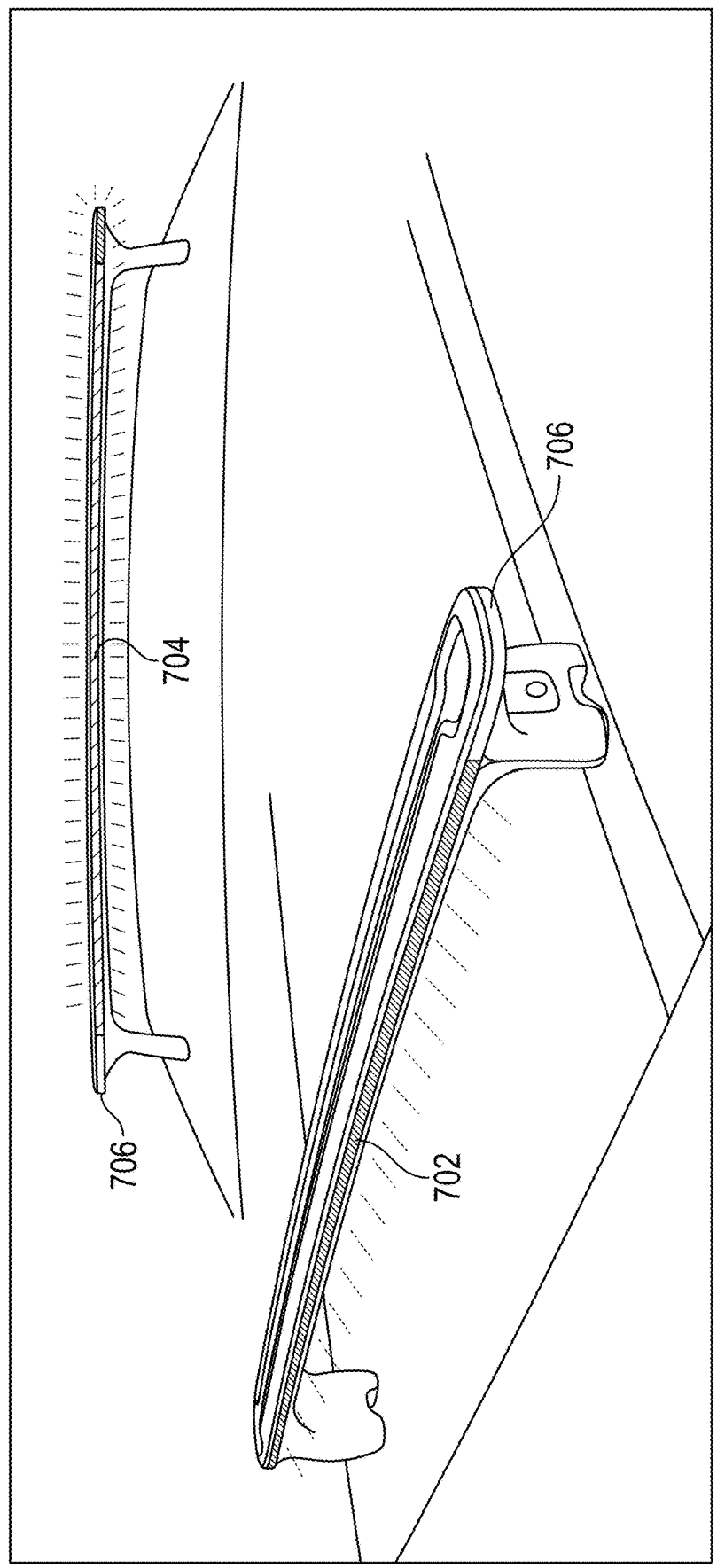

FIGS. 7A-7C illustrate an example action performed by a light source of a crossbar in response to a controller determining a vehicle turn sequence. FIGS. 7A-7C illustrate front side light sources 702, back side light sources 704, and lateral end light sources 706. As shown in FIG. 7A, front side light sources 702 perform a white light generation action and back side light sources 704 perform a red light generation action. In this arrangement, the vehicle may be operating in a driving mode (e.g., the vehicle is parked or driving and no vehicle sequences have been determined). In FIG. 7B, light sources of the lateral end light source 706 perform a yellow light generation action. In the example of FIG. 7B, the intensity of the yellow light is greater than the intensity of the white light generated by the front side light sources 702 and the red light generated by the back side light sources 704. In this way, attention is drawn to the vehicle turn. In FIG. 7C, the lateral end light source has stopped performing the yellow light generation action. In some embodiments, the lateral end light sources 706 may alternate between FIGS. 7B and 7C while the vehicle turn sequence is determined.

In some embodiments, determining a vehicle turn sequence includes detecting activation of a turn control (e.g., receiving user input on a steering column mounted control, a VDM ECU monitoring a vehicle's steering), detecting an auto pilot initiating a turn (for example, an ACM ECU), detecting an auto pilot initiating a lane change, etc. (for example, an ACM ECU). In some embodiments, determining a vehicle turn sequence includes detecting that a vehicle turn light has been activated (for example, a RZC ECU or BCM ECU operating turn lights). A controller determines a vehicle turn sequence has ended when, for example, a vehicle turn signal is turned off, a time has elapsed since the vehicle sequence was determined, or a controller (e.g., a VDM ECU, a CGM ECU) determines a return to a normal mode. In response to determining a vehicle turn sequence has ended, a controller can, for example, stop causing a light source to perform an action, cause the light source to perform the light generation actions in place before the controller determined the vehicle turn sequence, or cause the light source to perform light generation actions associated with a mode of the vehicle (for example, the normal mode depicted in FIG. 7A).

The vehicle sequence is, in some embodiments, a chase sequence and the action includes a first light source performing a white light generation action and second and third light sources of the plurality of light sources performing a yellow light generation action, wherein the first light source is positioned between the second and third light sources. In some embodiments, the action performed in response to determining a chase sequence includes fourth and fifth light sources performing a red light generation action. In some embodiments, the second and third light sources are positioned between the fourth and fifth light sources.

Figure 8A:
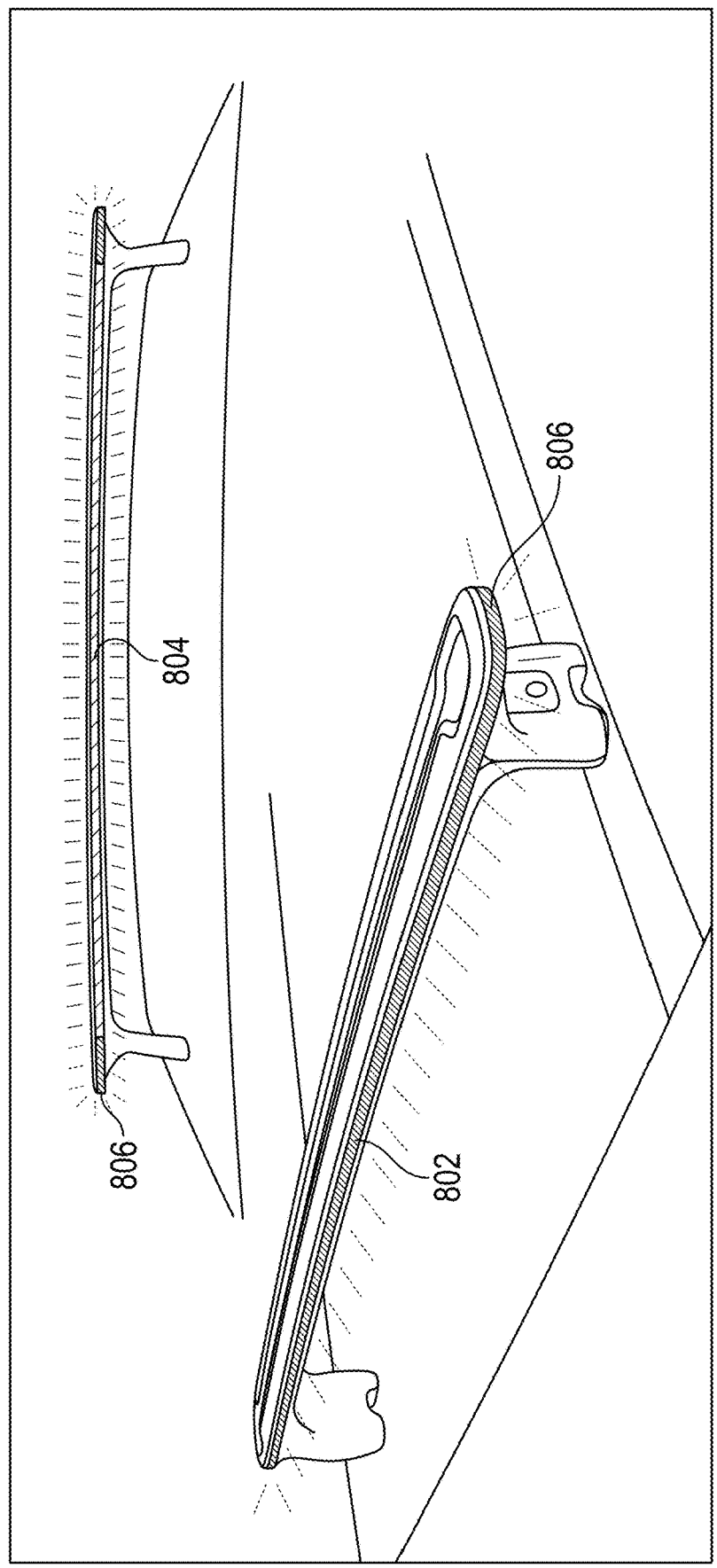
Figure 8B:
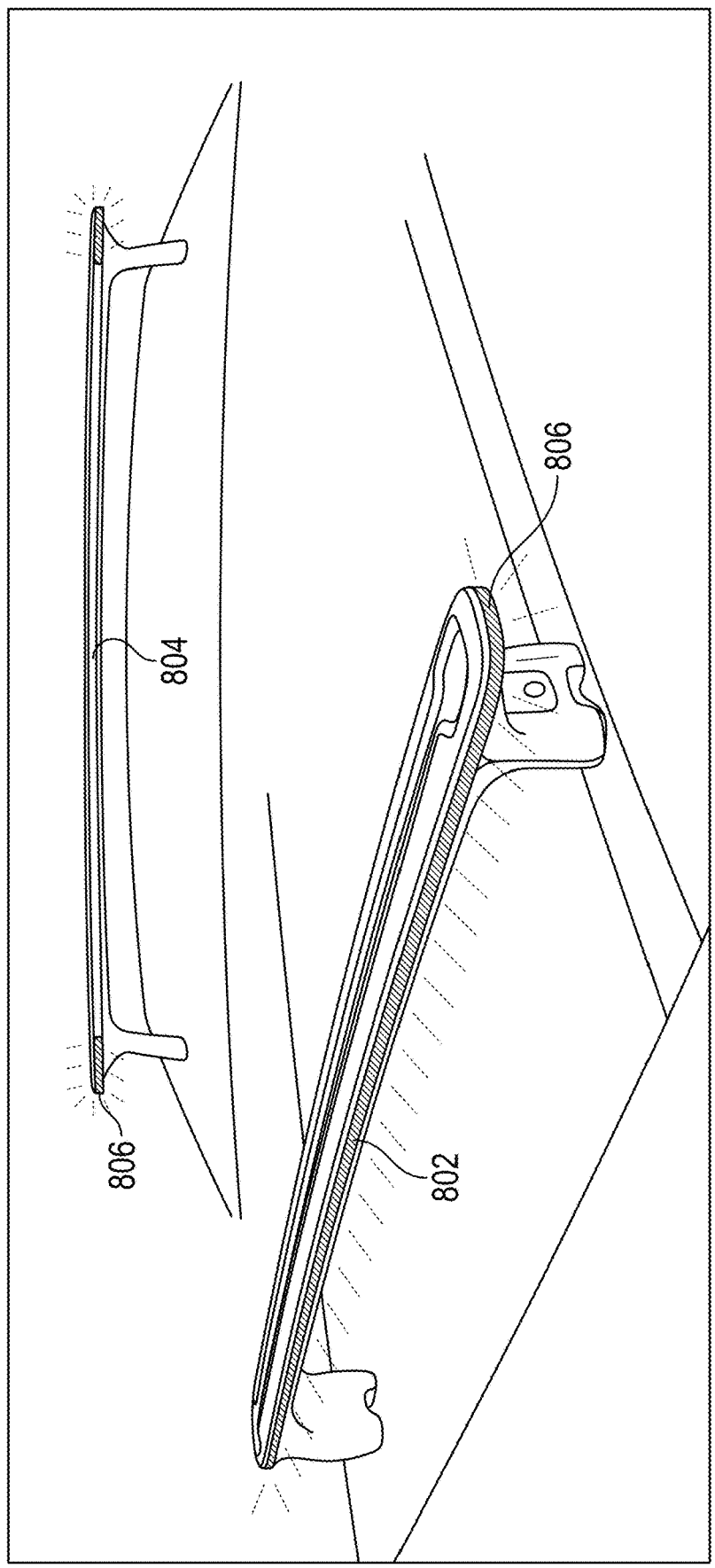
Figure 8C:
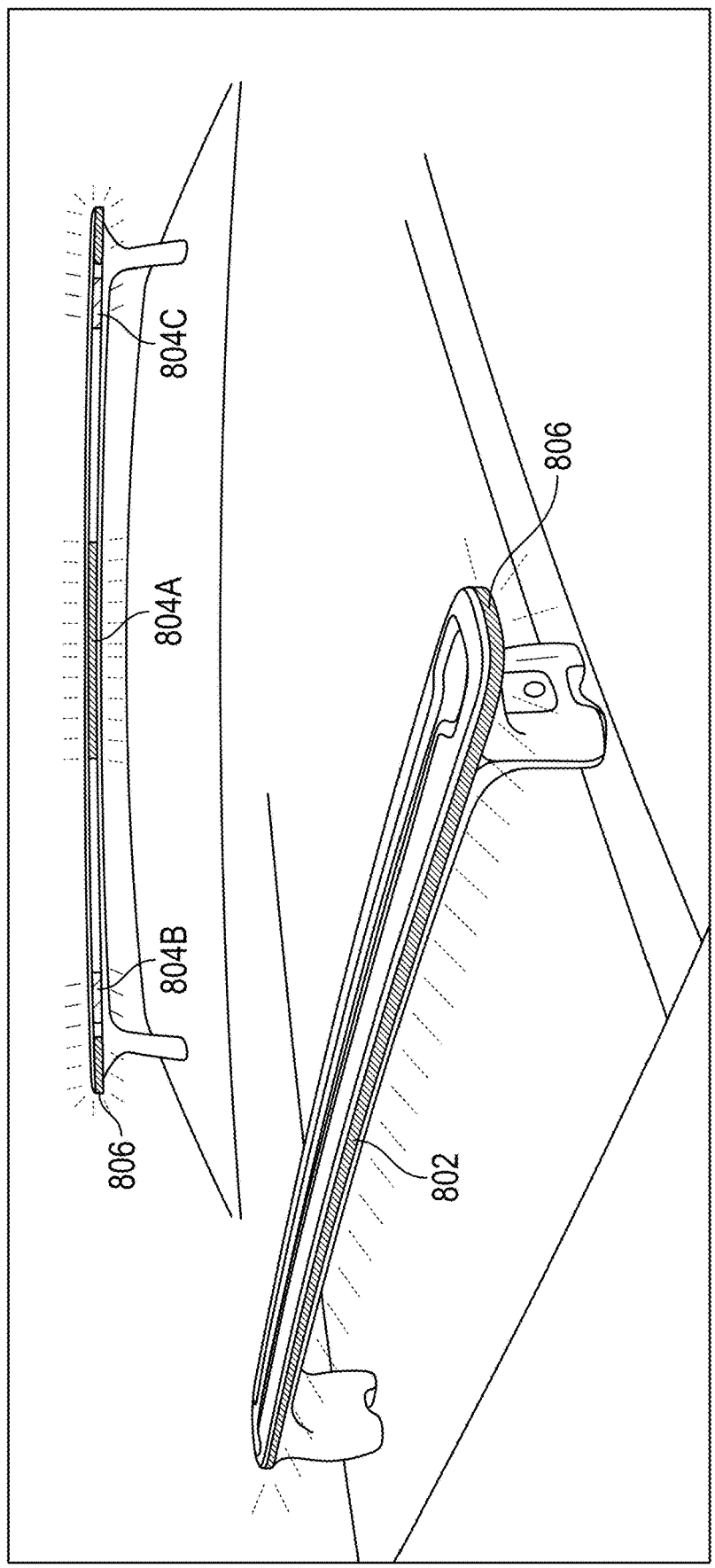
Figure 8D:
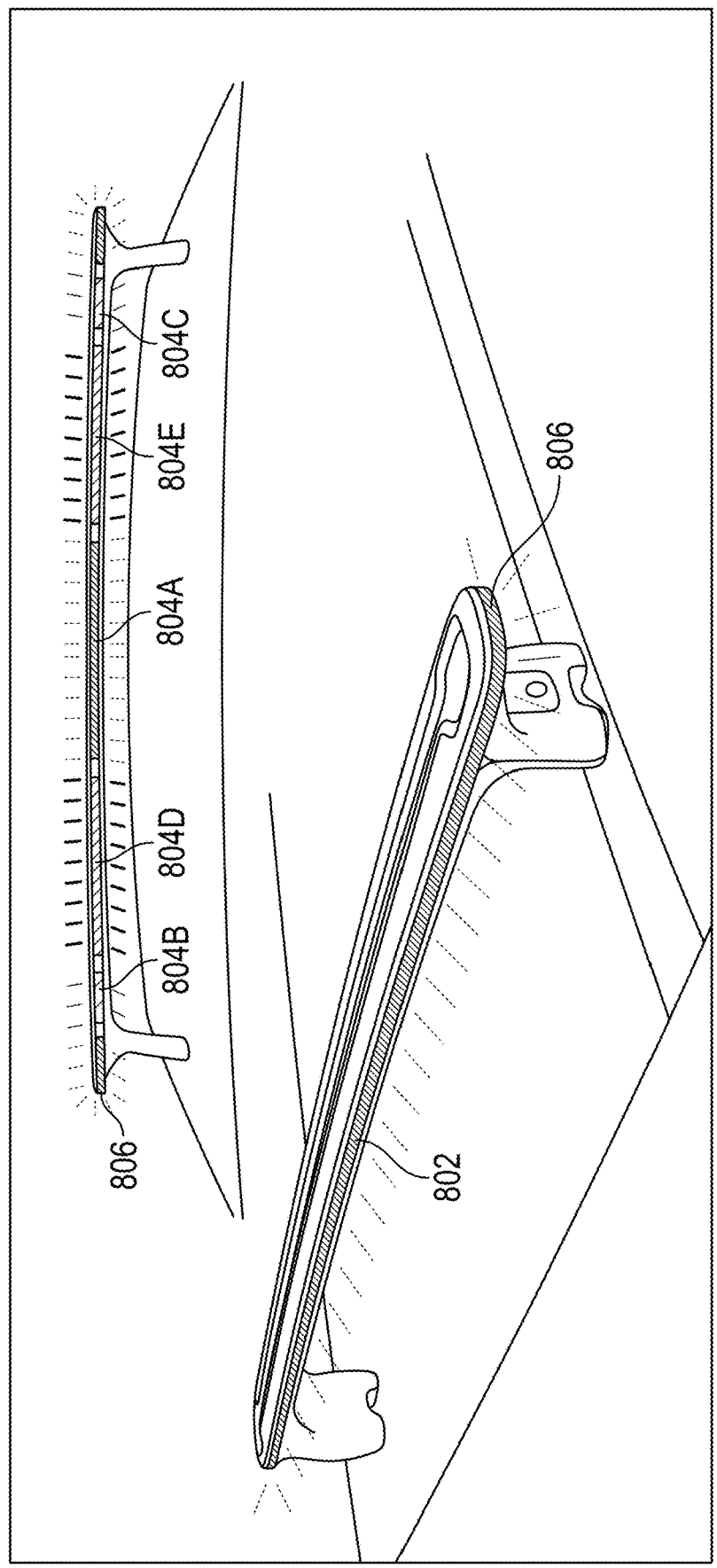
Figure 8E:
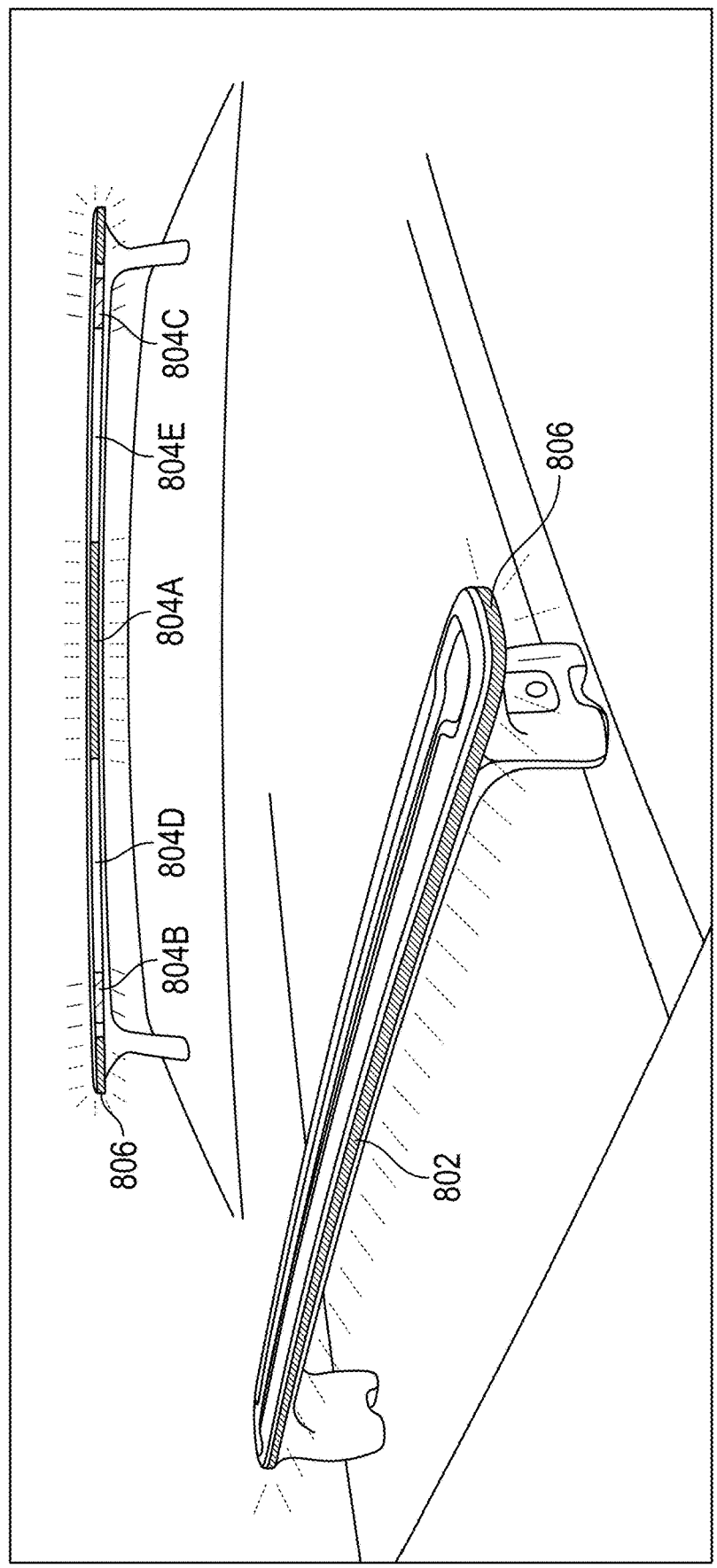
Figure 8G:
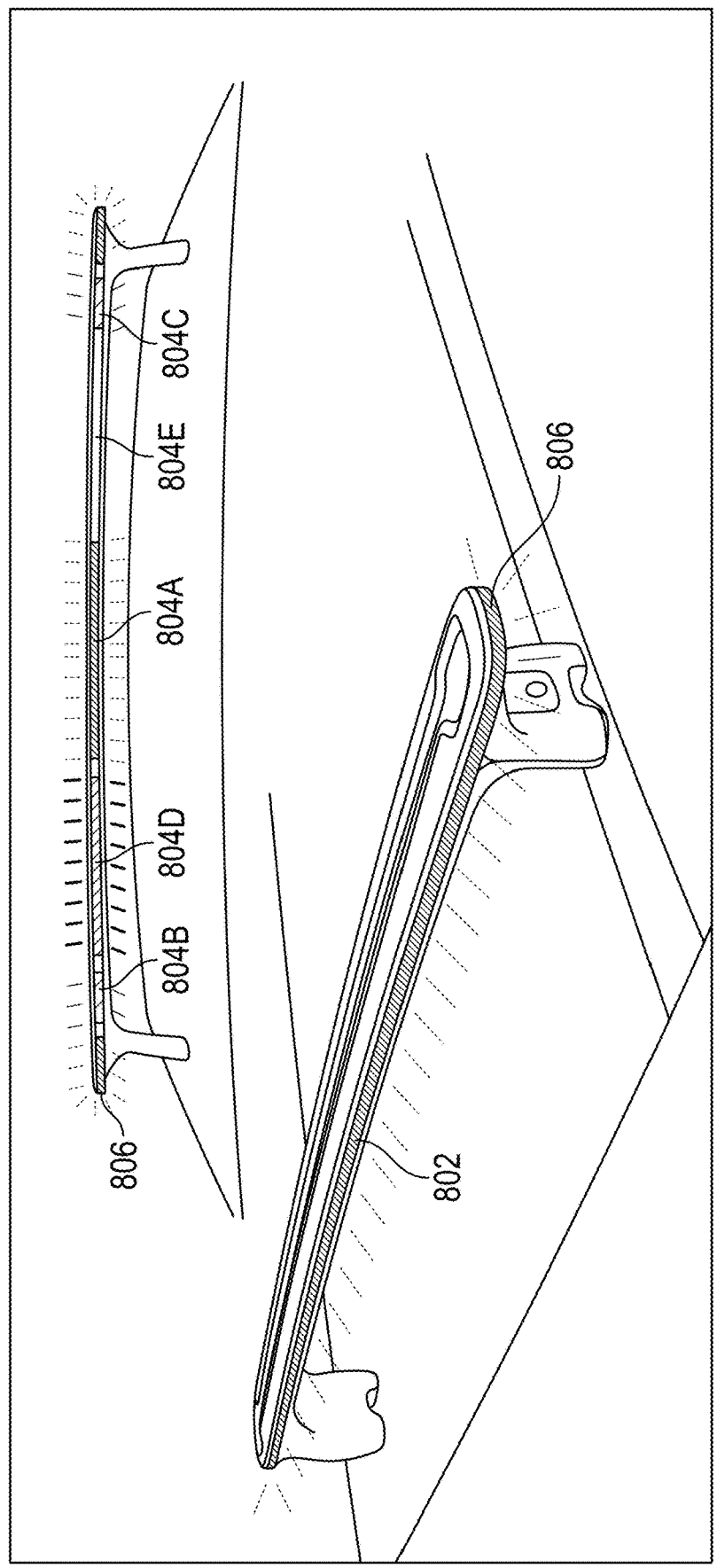

FIGS. 8A-8G illustrate an example action performed by a light source of a crossbar in response to a controller determining a chase sequence. FIGS. 8A-8G illustrate front side light sources 802, back side light sources 804, and lateral end light sources 806. As shown in FIG. 8A, front side light sources 802 perform a white light generation action and back side light sources 804 perform a red light generation action. In this arrangement, the vehicle may be operating in a normal operation mode (e.g., the vehicle is parked or driving and no vehicle sequences have been determined). FIG. 8B illustrates back side light sources 804 no longer performing a light generation action. In FIG. 8C, light sources 804A of the back side light sources 804 perform a white light generation action and light sources 804B and 804C of the back side light sources 804 perform a red light generation action. In FIG. 8D, light sources 804D and 804E (positioned on either side of the light sources 804A) of the back side light sources 804 perform a yellow light generation action. The yellow light generation action of light sources 804D and 804E is at an intensity greater than the white light generation action of 804A and the red light generation action of 804B and 804C. In FIG. 8E, light sources 804D and 804E have stopped performing the yellow light generation action. In FIG. 8F, light sources 804E perform a yellow light generation action at an intensity greater than the white light generation action of 804A and the red light generation action of 804B and 804C. In FIG. 8G, light sources 804E have stopped performing the yellow light generation action and light sources 804D perform a yellow light generation action at an intensity greater than the white light generation action of 804A and the red light generation action of 804B and 804C. In some embodiments, the lighting patterns of FIGS. 8B-8G are repeated until the chase sequence is determined to have ended.

In some embodiments, a controller determines a chase sequence by receiving a chase notification by a third party (e.g., an law enforcement authority has communicated a chase instruction). In such embodiments, a TCM ECU may receive the notification and determine the chase sequence. A controller determines a chase sequence has ended when, for example, a new notification is received, the vehicle is placed in Park, a time has elapsed since the vehicle sequence was determined, or a controller (e.g., a VDM ECU, a CGM ECU) determines a return to a normal mode. In response to determining a vehicle chase has ended, a controller can, for example, stop causing a light source to perform an action, cause the light source to perform the light generation actions in place before the controller determined the chase sequence, or cause the light source to perform light generation actions associated with a mode of the vehicle (for example, the normal mode depicted in FIG. 8A).

The vehicle sequence is, in some embodiments, an accessory insertion sequence and the action includes a light generation action by a light source associated with the accessory insertion port.

Figure 9A:
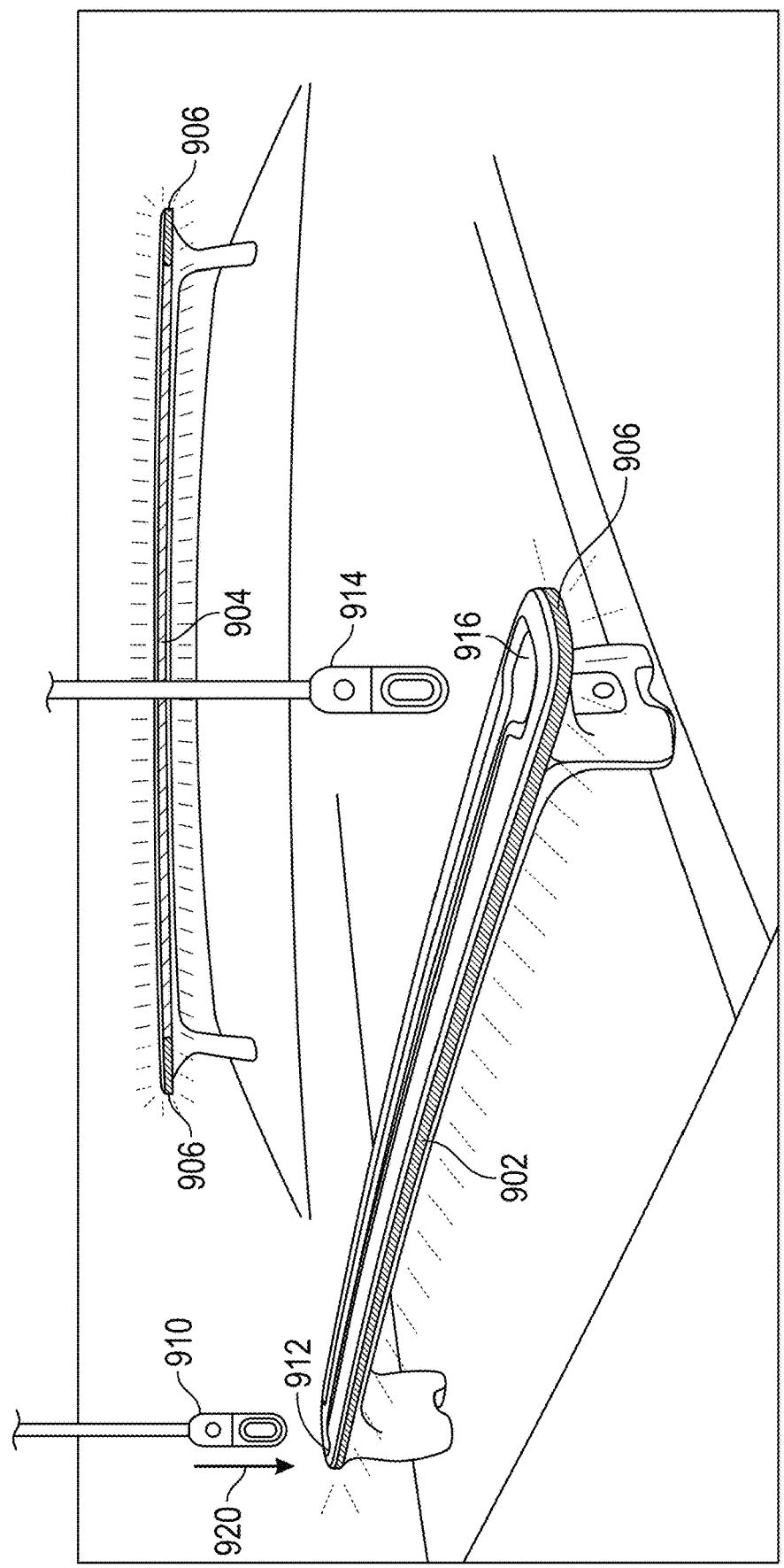
FIGS. 9A-9G illustrate an example action performed by a light source of a crossbar.

FIGS. 9A-9G illustrate an example action performed by a light source of a crossbar in response to a controller determining an accessory insertion sequence. FIGS. 9A-9G illustrate front side light sources 902, back side light sources 904, and lateral end light sources 906. The crossbars illustrated in FIGS. 9A-9G illustrate light sources performing light generation actions in response to insertion of accessories 910 and 914 into accessory insertion ports 912 and 916, respectively. As shown in FIG. 9A, front side light sources 902 perform a white light generation action and back side light sources 904 perform a red light generation action. In this arrangement, the vehicle may be operating in a normal operation mode (e.g., the vehicle is parked or driving and no vehicle sequences have been determined).

As used herein, a light source is associated with an accessory insertion port if the light source's position relative to the accessory insertion port distinguishes that accessory port from a different accessory port. For example, in FIGS. 9A-9G, front side light sources 904A positioned on the left of the crossbar are associated with the left side accessory port 912 and front side light sources 904B on the right of the crossbar are associated with the right side accessory port 916. In the case of a crossbar with one port, any light source could be associated with the accessory insertion port.

Figure 9B:
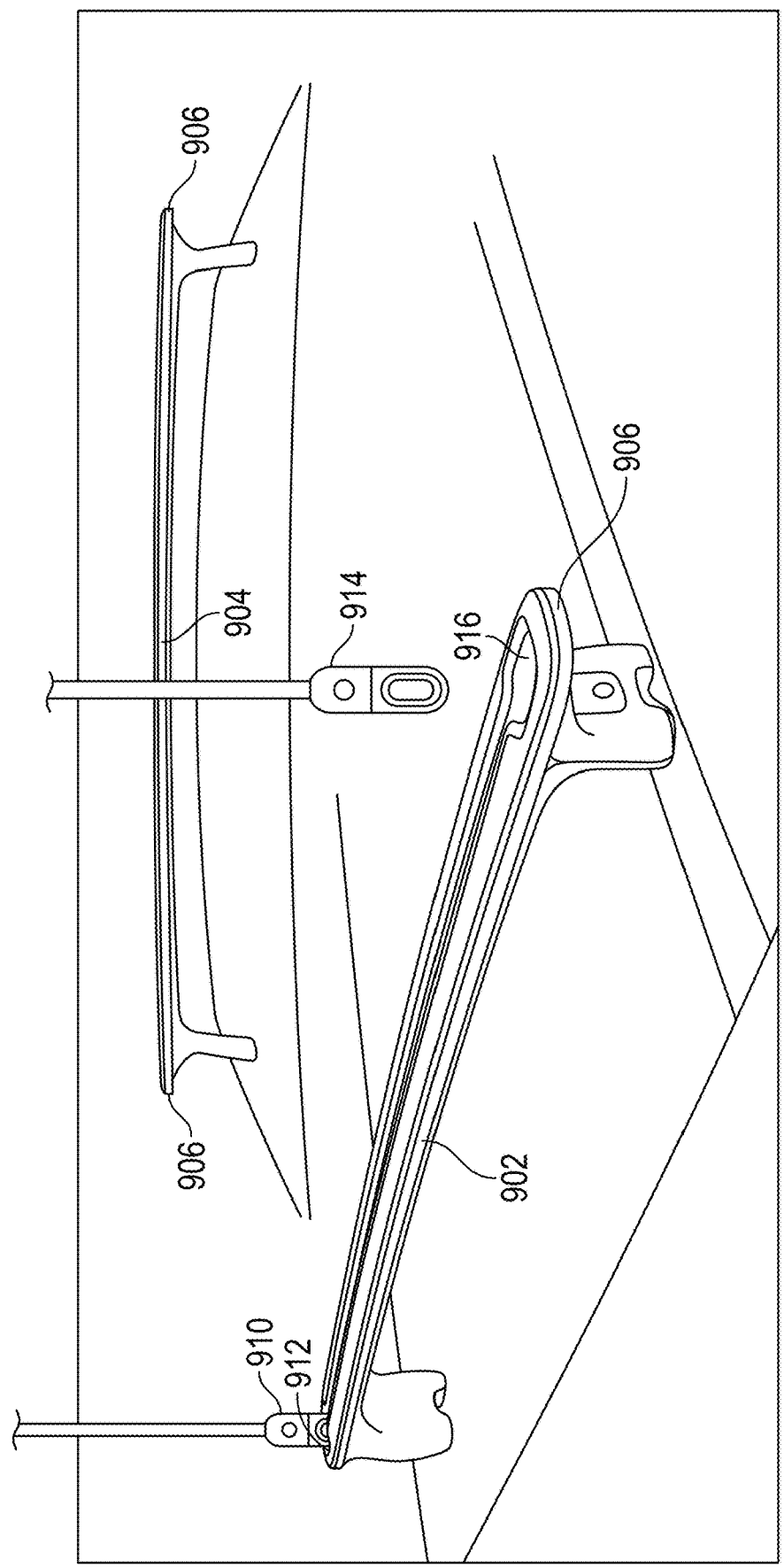
Figure 9C:
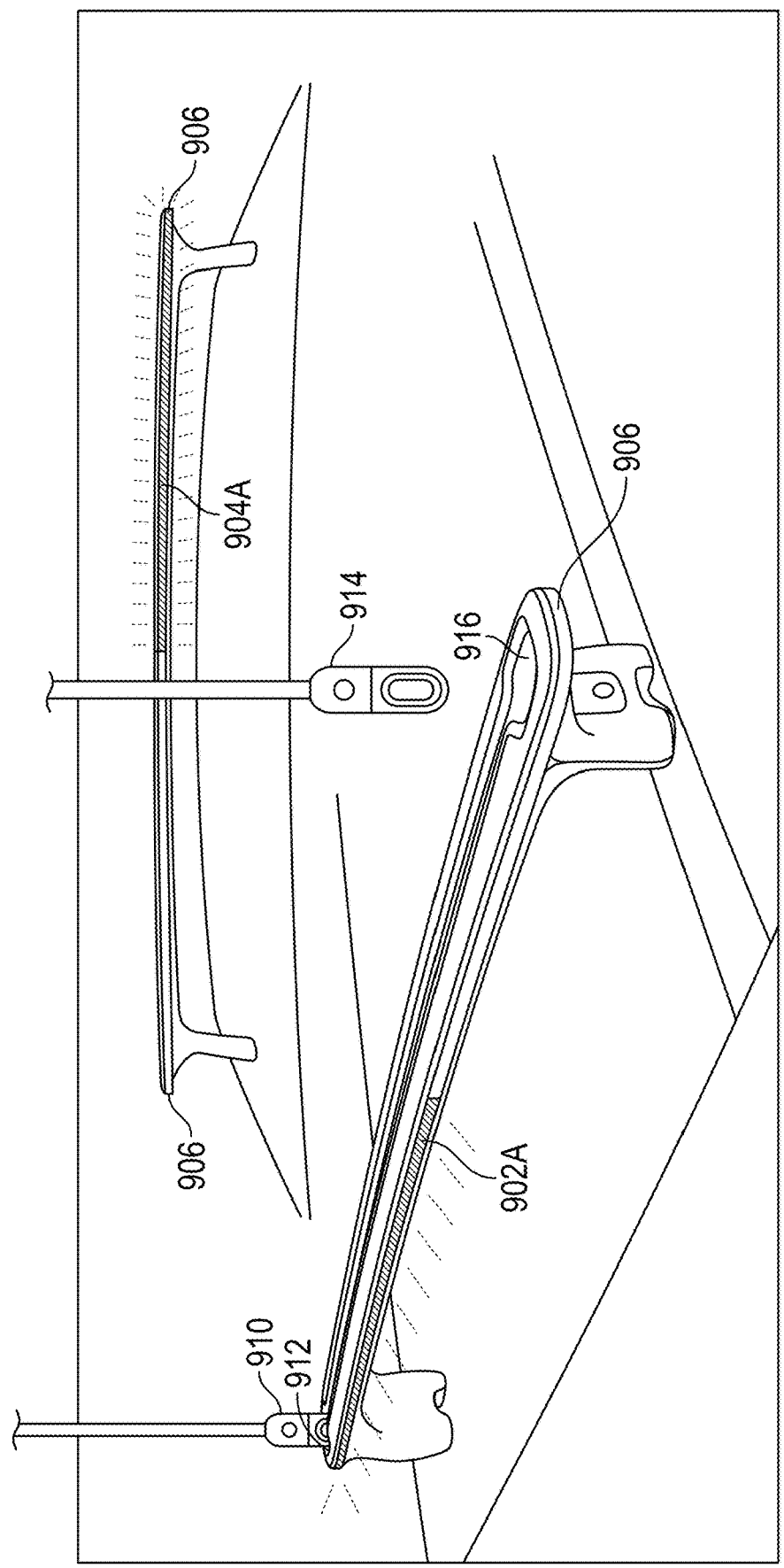
Figure 9D:
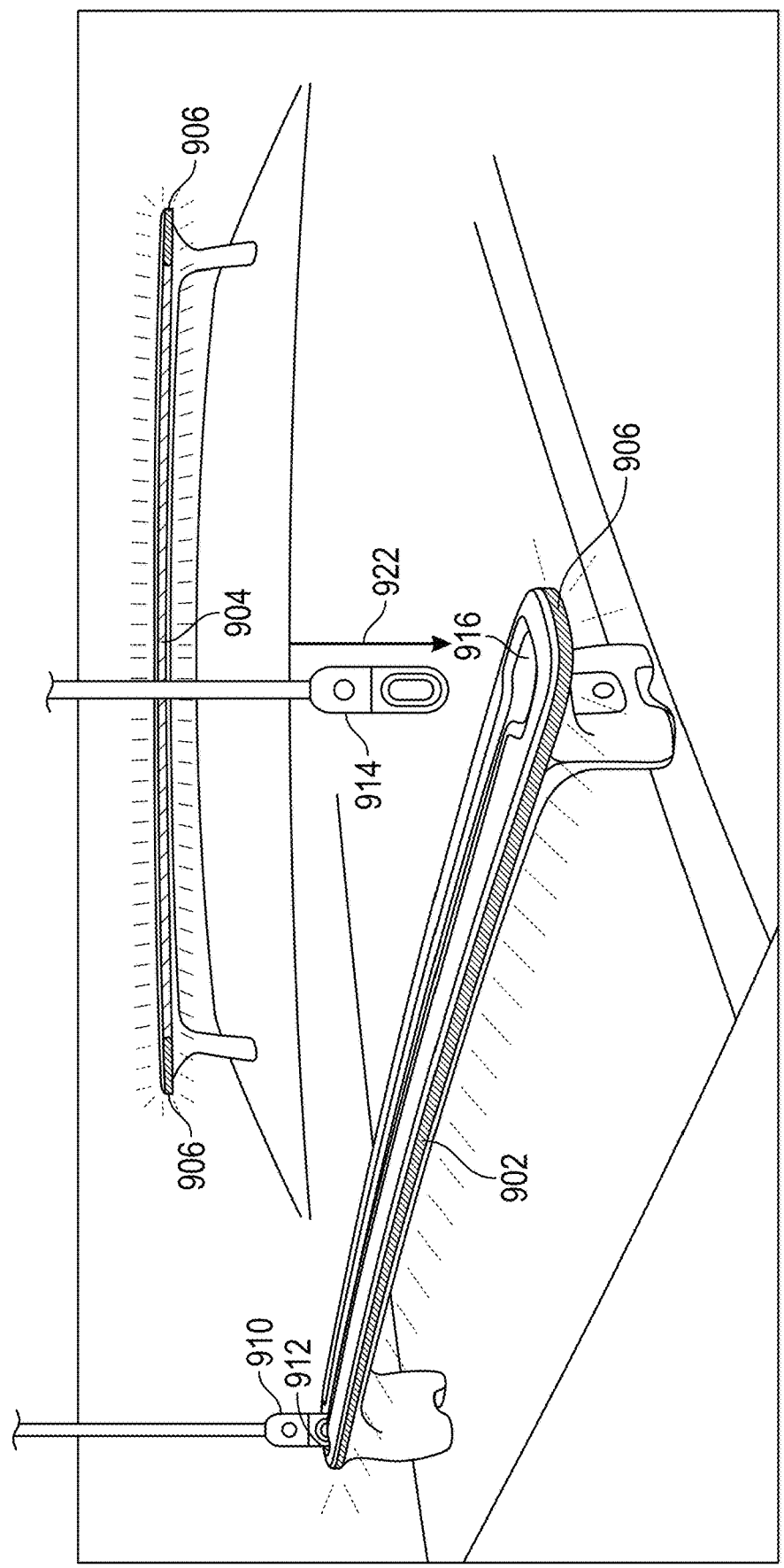
Figure 9E:
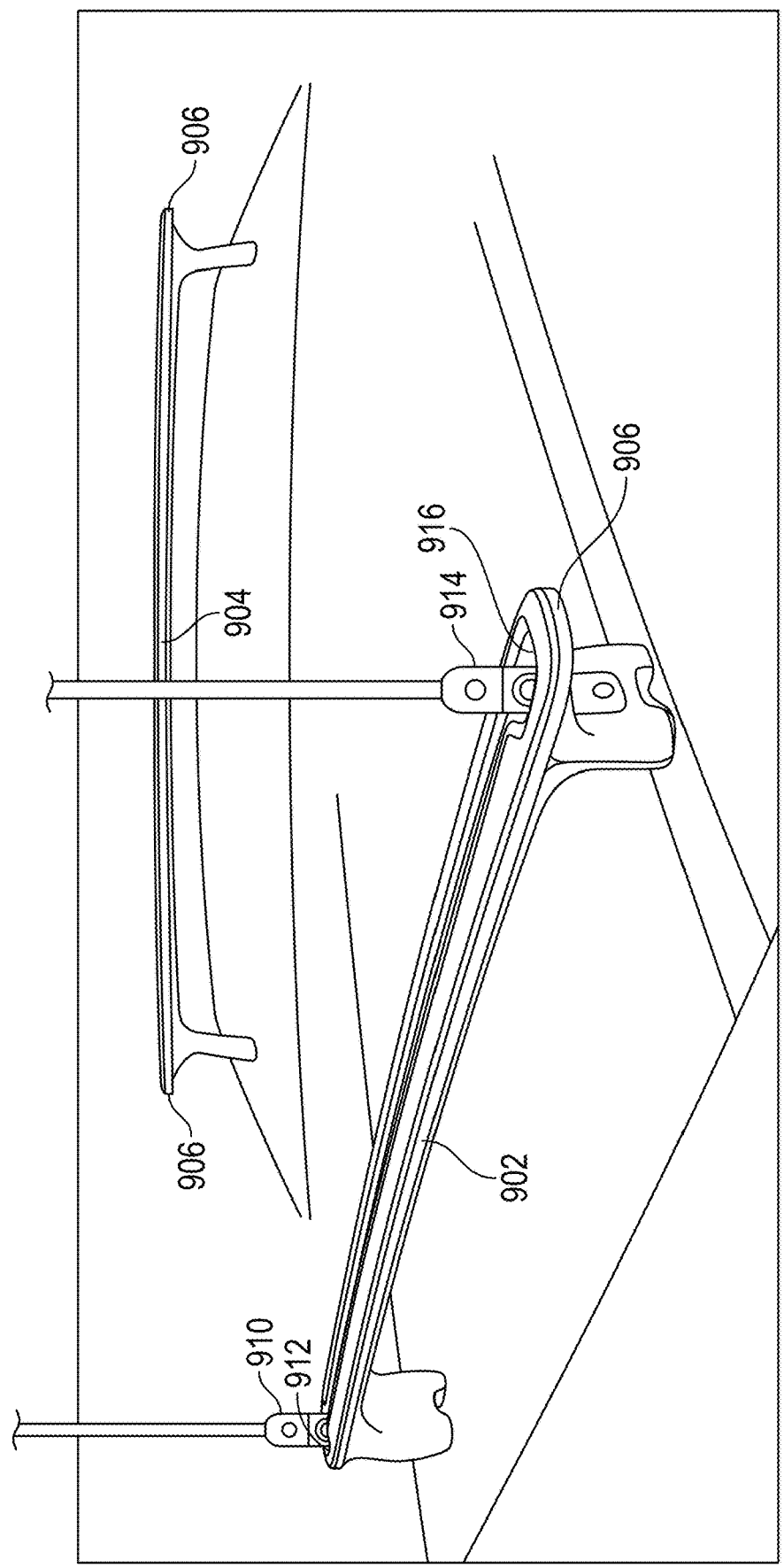
Figure 9F:
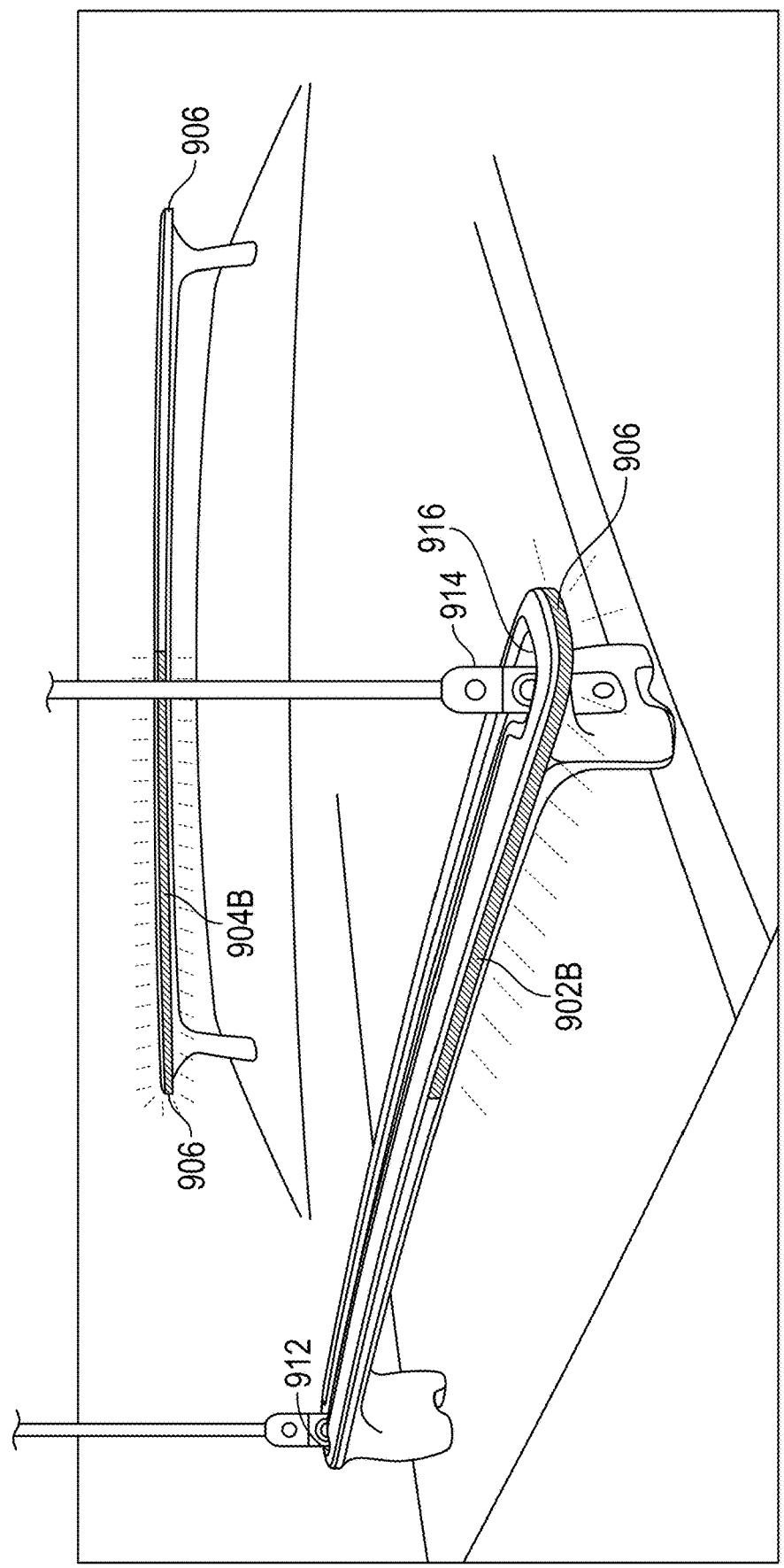
Figure 9G:
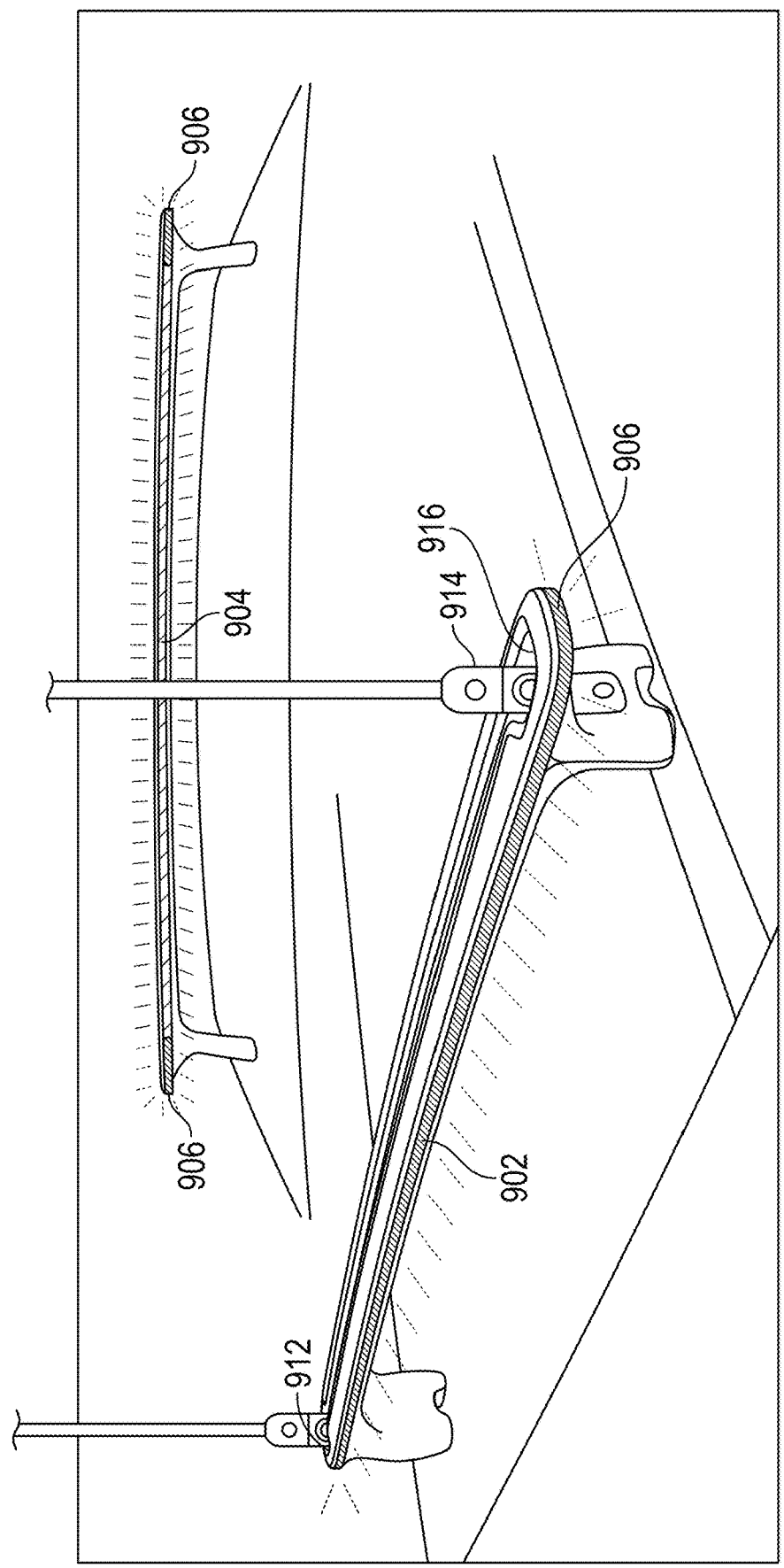

In FIG. 9A, accessory 910 is inserted in direction 920 into accessory port 912. As shown in FIG. 9B, in response to determining insertion of accessory 910 into port 912, a controller has caused all light sources in the crossbar to stop performing light generation actions. To announce successful insertion of the accessory, a controller caused light sources 902A and 904A associated with the insertion port 912 to perform white light generation actions. These actions are illustrated in FIG. 9C. In FIG. 9D, the accessory insertion sequence of accessory 910 has ended and the controller has caused the light sources of the crossbar to return to the actions shown before the controller determined the accessory insertion sequence (i.e., the light generation actions depicted in FIG. 9A). Also shown in FIG. 9D is insertion of accessory 914 inserted in direction 922 into accessory port 916. FIGS. 9E-9G follow the same sequence for insertion of an accessory into insertion port 916 as FIGS. 9B-9D follow for insertion of an accessory into insertion port 912: in FIG. 9E, the controller caused all light sources to stop light generation actions; in FIG. 9F, the controlled a controller caused light sources 902B and 904B associated with the insertion port 916 to perform white light generation actions; and, in FIG. 9G, the accessory insertion sequence of accessory 914 has ended and the controller has caused the light sources of the crossbar to return to the actions shown before the controller determined the accessory insertion sequence (i.e., the light generation actions depicted in FIG. 9D).

In FIGS. 9A-9G, the depicted accessories are gear guard cables. It will be appreciated that other accessories could be inserted in the accessory insertion ports. The gear guard cables may include additional features, such as integrated gear security, automatic cinching/attachment, load sensing, autonomous driving sensors, and/or gear collision detection warnings. With respect to gear security, the crossbar may include integrated cable locks, cameras, accelerometers, or other features to ensure security of items placed on the crossbars. A cable lock may be self-retracting to take up any slack in the cable that could flop around in the wind while driving (extra length could be stored within the crossbar). With respect to automatic cinching of the latch, a motor (not shown) within the crossbar can drive a latching mechanism. In embodiments with load sensing, strain gauges or other sensors in the crossbar can calculate load, which is then fed to the vehicle to provide alerts for overloading or range adjustment calculations. Such sensors can be paired with additional sensors to identify if an item is loose on the crossbar, again providing an alert to a user. In embodiments with autonomous driving sensors, sensors such as radar could be embedded into the crossbar to assist autonomous driving features. Gear collision warnings can be provided, in some embodiments, using cameras or other sensors to objects on the crossbar and can give warnings if an underpass, garage, or other low hanging item is at risk of collision with the object.

In some embodiments, a controller determines an accessory insertion sequence by determining communicating with the accessory (for example, a CGM ECU communicates with an accessory). A controller determines an accessory insertion sequence has ended when, for example, an accessory communicates that the insertion process has completed, a time has elapsed since the vehicle sequence was determined, or a controller (e.g., a VDM ECU, a CGM ECU) determines a return to a normal mode. In response to determining an accessory insertion has ended, a controller can, for example, stop causing a light source to perform an action, cause the light source to perform the light generation actions in place before the controller determined the vehicle unlock sequence, or cause the light source to perform light generation actions associated with a mode of the vehicle (for example, the normal mode depicted in FIG. 5A).

In addition to the sequences illustrated above with respect to FIGS. 5A-9G, a controller could determine other vehicle sequences and cause a light source to perform an action associated with the sequence. For example, a vehicle accident or vehicle damage could be determined (e.g., a VDM ECU monitoring a vehicle drivetrain or suspension) or an emergency incident is determined (e.g., a VDM ECU determines an emergency brake has been activated while the vehicle is Drive mode) and a controller could cause a light source to perform a hazard light action (e.g., a flashing yellow light generation action at a lateral end light source). In some embodiments, a controller determines a truck bed use sequence (e.g., a RZC ECU determines a tonneau cover activation, a sidebin latch activation, a tailgate latch activation, or a cargo lamp activation) and controls back side light sources to perform light generation actions that illuminate the truck bed. In some embodiments, a controller determines an exterior light activation by a vehicle controller (e.g., a BCM ECU causing light actions of headlamps, side lights, rear lights, camp lights) and causes light sources in the crossbar to perform light actions that supplement the vehicle lighting). For example, Winch Control Module (WCM) ECU may cause vehicle lights to perform actions that bring attention to the vehicles' use of winch; a controller can, in response to determining that the WCM ECU is bringing attention via the vehicle's lights, cause light sources on the crossbar to perform light generation actions that also bring attention to the vehicle's use of the winch.

Figure 10B:
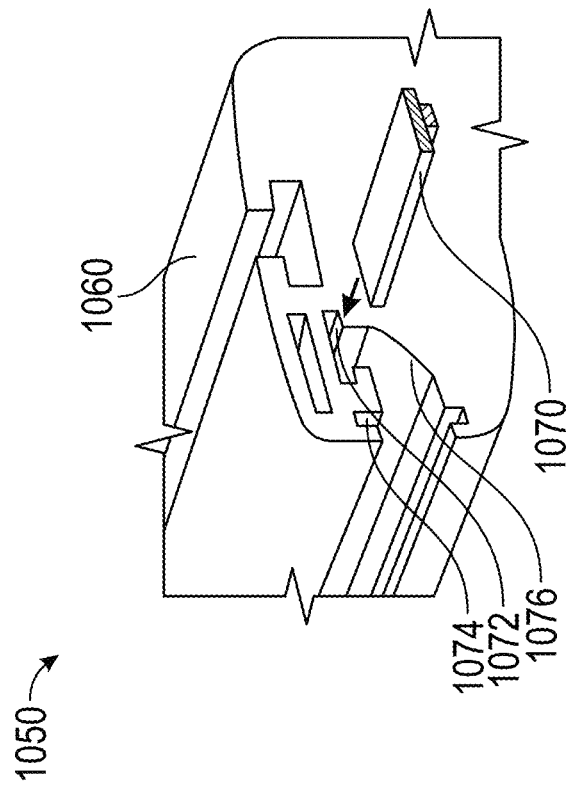
FIGS. 10A and 10B illustrate example crossbars.
Figure 10A:
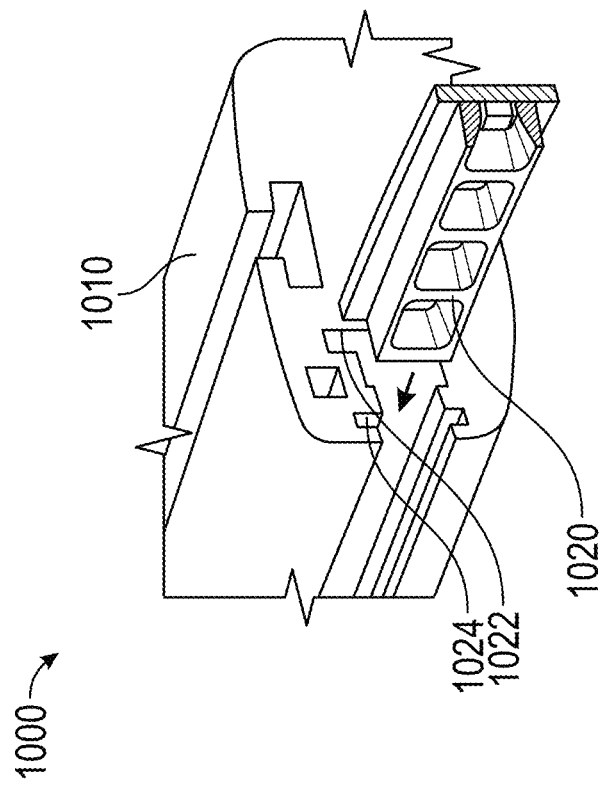

FIGS. 10A and 10B illustrate example crossbars 1000 and 1050. Crossbars 1000 and 1050 could be the crossbars illustrated in FIGS. 1-3, could be controlled by the user interface illustrated in FIG. 4, and could perform the actions illustrated in FIGS. 5A-9G. FIGS. 10A and 10B illustrate crossbars 1000 and 1050 in cross-section to show exemplary structural arrangements of the crossbars. Crossbars 1000 and 1050 include top surfaces 1010 and 1050, respectively. Light strips 1020 and 1070 are inserted into channels 1022 and 1072, respectively. The light strips generate light to perform the actions described herein. In light strips 1020 and 1070, LEDs (visible in FIG. 10A) are individually controllable. In each crossbar, a panel (not shown) is inserted into channel 1024 and 1074, respectively. In some embodiments, the panel is a light diffusor panel that softens harsh light and reduces glare. In FIG. 10A, light strip 1020 of crossbar 1000 illuminates light directly onto the panel. In FIG. 10B, light strip 1070 reflects light from reflective surface 1076 and then onto the panel.

In some embodiments, the bodies of crossbars 1000 and 1050 are manufactured by aluminum extrusion. An aluminum extrusion may advantageously provide an effective heat sink for the light strips. This may be particularly advantageous when employing high power light sources which generate more heat. Additional thermal management may be provided by airflow over the crossbar while the vehicle is driving. Aluminum extrusion may also allow the crossbar to be lightweight while providing enough strength to hold cargo or equipment on the roof.

Figure 11:
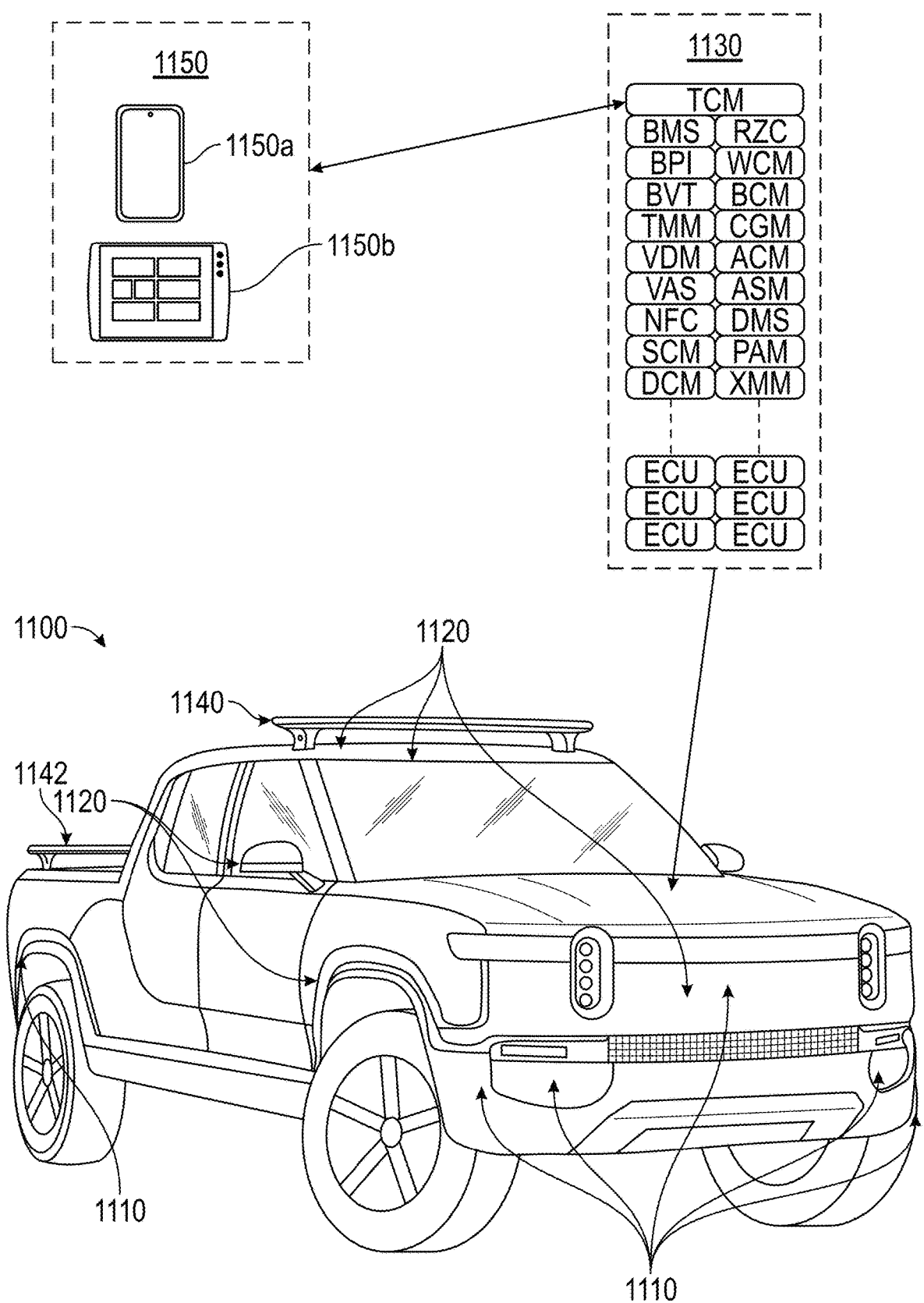
FIG. 11 illustrates an example vehicle.

FIG. 11 illustrates an example vehicle 1100 with crossbars 1140 and 1142. In some embodiments, crossbars 1140 and 1142 include features described herein with respect to crossbars 110, 120, 210, 220, 300, 1000, and 1050.

Vehicle 1100 may include multiple sensors 1110, multiple cameras 1120, and a control system 1130. In some embodiments, vehicle 1100 may be able to pair with a computing device 1150 (e.g., smartphone 1150a, tablet computing device 1150b, or a smart vehicle accessory). As an example and not by way of limitation, a sensor 1110 may be an accelerometer, a gyroscope, a magnometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 1120 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 1100 may include various controllable components (e.g., doors, seats, windows, lights, HVAC, entertainment system, security system), instrument and information displays and/or interactive interfaces, functionality to pair a computing device 1150 with the vehicle (which may enable control of certain vehicle functions using the computing device 1150), and functionality to pair accessories with the vehicle, which may then be controllable through an interactive interface in the vehicle or through a paired computing device 1150.

Control system 1130 may enable control of various systems on-board the vehicle. As shown in FIG. 11, control system 1130 may comprise one or more ECUs, each of which are dedicated to a specific set of functions. Each ECU may be a computer system (as described further in FIG. 13), and each ECU may include functionality provided by one or more of the example ECUs described below.

Features of embodiments as described herein may be controlled by a VDM ECU. The VDM ECU may control a number of different functions related to aspects of the vehicle's drivetrain, regenerative braking, suspension, steering, traction control, distribution of mass, aerodynamics, and driving modes. In some embodiments, the VDM ECU may, by way of example and not limitation, control vehicle acceleration, control vehicle energy regeneration, calculate torque distribution, provide traction control, control drive modes, provide odometer functions, control driveline disconnects, adjust damping, adjust roll stiffness, adjust ride height, automatically level a vehicle when on a slope, and control the emergency parking brake driver.

Features of embodiments as described herein may be controlled by one or more ECUs that provide functionality to control access to the vehicle. A VAS ECU may provide passive/active wireless sensors (e.g., Bluetooth) authorizing accessing (i.e., locking or unlocking) the vehicle. A NFC ECU may support an NFC reader embedded in the vehicle (e.g., in the driver-side exterior door handle or in the armrest of the interior, driver-side door panel) for user authentication.

Features of embodiments as described herein may be controlled by a TCM ECU. The TCM ECU may provide a wireless vehicle communication gateway to support functionality such as, by way of example and not limitation, over-the-air (OTA) software updates, communication between the vehicle and the internet, communication between the vehicle and a computing device 1150, in-vehicle navigation, vehicle-to-vehicle communication, communication between the vehicle and landscape features (e.g., automated toll road sensors, automated toll gates, power dispensers at charging stations), or automated calling functionality.

Features of embodiments as described herein may be controlled by one or more ECUs that provide functionality to control interior cabin components of the vehicle. A DCM ECU may provide functionality to sense outside ambient temperature or to control one or more components of a door of the vehicle, such as, by way of example and not limitation: window glass (e.g., moving the glass up or down), door locks, door handles (e.g., automatically moving in or out to facilitate grasping the handle), lamp(s), side mirror(s) (e.g., up, down, in, out, fold, unfold), mirror heater(s), electrochromatic mirror dimmers, turn signals, approach lighting, spotlight(s), blind spot monitor lamp(s), or window switch lamp(s).

Features of embodiments as described herein may be controlled by a RZC ECU. The RZC ECU may provide functionality to control different body components, such as, by way of example and not limitation, a license plate lamp, based on vehicle body type. For vehicles with a truck bed, the RZC ECU may provide functionality to control a tonneau cover, sidebin latch, tailgate latch, sidebin lights, or cargo lamps. For a sport utility-type vehicle with a rear door, the RZC ECU may provide functionality to control liftgate latches, a liftgate actuator, puddle lamps, or a rear wiper. For vehicles with a tow hitch, the RZC ECU may provide functionality to control trailer braking or a trailer brake stop light. For vehicles with a third row of seats, the RZC ECU may provide functionality to control movement of interior components to facilitate easy entry to the rear seats. For a delivery vehicle, the RZC ECU may provide functionality to control movement of a bulkhead door motor and latches, rollup door latches, various lamps, rear stop lights, and turn lights.

Features of embodiments as described herein may be controlled by a BCM ECU. The BCM ECU may provide electronic controls for various components of the body of the vehicle, such as, by way of example and not limitation: interior lighting (e.g., cabin lights, seatbelt lights), exterior lighting (e.g., headlamps, side lights, rear lights, camp lights), power outlets, frunk switch, window wiper movement and washer fluid deployment, the overhead center console, horn, power ports, and wireless accessory charging and docking.

Features of embodiments as described herein may be controlled by a WCM ECU. The WCM ECU may provide functions to operate a winch mounted on or incorporated into the vehicle. The WCM ECU may control reeling the winch cable in and out, measure the force of a payload on the winch assembly, control a winch remote clutch, and provide safety features related to the winch.

Features of embodiments as described herein may be controlled by a CGM ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s).

Features of embodiments as described herein may be controlled by one or more ECUs may provide functions of an automated driving system (ADS) and/or an advanced driver assistance system (ADAS) that may be enabled by a driver of the vehicle to provide one or more functions to support driving assistance and/or automation. An ACM ECU may process data captured by cameras #20 and/or sensors #10. In some embodiments, the ACM ECU may provide artificial intelligence functionality to provide and/or refine functions to support driving assistance and/or automation. An Autonomous Safety Module (ASM) ECU may provide functions to support driving safety by monitoring sensors that support self-driving functions. A Driver Monitoring System (DMS) ECU may provide functionality to monitor and inform the control system about the driver's level of attention (e.g., while relying on driving assistance and/or automation functions). The DMS may process data captured by a camera positioned to monitor the driver's gaze. A Park Assist Module (PAM) ECU may provide functions to assist a driver during manual and/or automated parking operations. The PAM ECU may process data captured by cameras #20 and/or sensors #10 in order to determine appropriate control commands.

Features of embodiments as described herein may be controlled by an XMM ECU that generates a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 1130.

Vehicle 1100 may include one or more additional ECUs, such as, by way of example and not limitation: a Seat Control Module (SCM) ECU, a Restraints Control Module (RCM) ECU, and/or an Autonomous eXperience Module (AXM) ECU. If vehicle 1100 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU.

Figure 12:
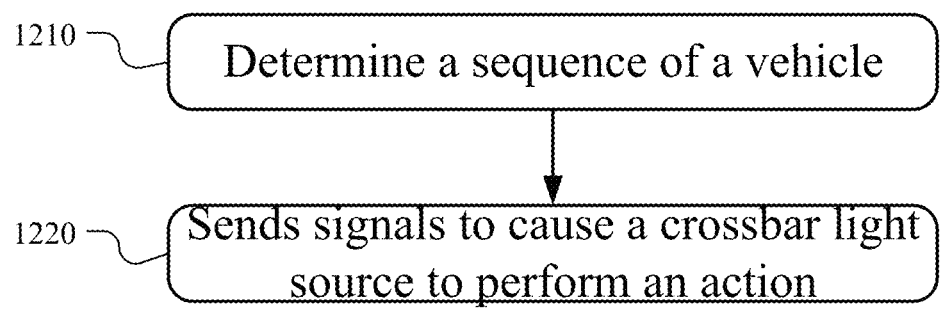
FIG. 12 is a flowchart illustrating steps of a method for controlling a crossbar of a vehicle.

FIG. 12 is a flowchart illustrating steps of a method 1200 for controlling a crossbar of a vehicle. Method 1200 may begin at step 1210 with determining a vehicle sequence. Method 1200 may then continue at step 1220 with, in response to determining the vehicle sequence, sending signal(s) to cause at least one crossbar light source to perform an action.

The sequence, in some embodiments of the method, includes a vehicle braking sequence, and the method further includes: in response to determining the vehicle braking sequence, causing a first light source on a back side of the crossbar to generate a red light and causing a second light source on a front side of the crossbar to generate a white light.

In some embodiments of the method, the sequence includes a vehicle turn sequence, and the method further includes: in response to determining the vehicle turn sequence, causing a light source on a lateral end of the crossbar to generate a periodic/pulsing yellow light.

The crossbar includes, in some embodiments of the method, an accessory insertion port and the sequence includes an accessory insertion sequence, and the method further includes: in response to determining the accessory insertion sequence, causing a light source of the plurality of light sources to generate a light, where the light source is associated with the accessory insertion port.

In some embodiments, the sequence includes a chase sequence, and the method further includes: in response to determining the chase sequence, causing a first light source of the plurality of light sources to generate a white light and causing second and third light sources of the plurality of light sources to generate yellow light, where the first light source is positioned between the second and third light sources.

The sequence includes, in some embodiments, a vehicle unlock sequence, and the method further includes: in response to determining the vehicle unlock sequence, causing a first light source of the plurality of light sources to generate a white light and subsequently causing second and third sources of the plurality of light sources to generate white light, where the first light source is positioned between the second and third light sources.

In some embodiments of the method, the sequence includes a follow sequence, and the method further includes: in response to determining the follow sequence, causing a first light source on the back side of the crossbar to generate a yellow light and causing second and third light sources on the back side of the crossbar to generate yellow light, where the first light source is positioned between the second and third light sources.

The sequence includes, in some embodiments of the method, a lock sequence, and the method further includes: in response to determining the lock sequence, causing light sources on the back side of the crossbar to generate a light at a first intensity, subsequently causing the light sources on the back side of the crossbar to generate a light at a second intensity, the first intensity greater than the second intensity.

In some embodiments of the method, the plurality of light sources include a forward facing light source, a rear facing light source, a lateral end light source, and a bottom surface light source.

The crossbar includes, in some embodiments of the method, an electrical connection. In some embodiments, the crossbar includes a mount for coupling the crossbar to a vehicle. In some embodiments, the crossbar include an electrical connection and a mount, wherein the mount comprises the crossbar. The crossbar includes, in some embodiments, an aluminum extrusion.

In some embodiments, the method includes receiving a user-originated sequence from a user interface, and determining the sequence includes determining the user-originated sequence.

Some embodiments of the method include: in response to determining the sequence, determining whether the sequence is restricted; in response to determining the sequence is not restricted, permitting causing the light source from the plurality of light sources to perform the action; in response to determining the sequence is restricted and a restriction criteria is met, permitting causing the light source from the plurality of light sources to perform the action; and in response to determining the sequence is restricted and a restriction criteria is not met, forgoing causing the light source from the plurality of light sources to perform the action.

Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for 1200 including the particular steps of the method of FIG. 12, this disclosure contemplates any suitable method for 1200 including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

FIG. 13A illustrates an example computer system 1300. Computer system 1300 may include a processor 1302, memory 1304, storage 1306, an input/output (I/O) interface 1308, a communication interface 1310, and a bus 1312. Although this disclosure describes one example computer system including specified components in a particular arrangement, this disclosure contemplates any suitable computer system with any suitable number of any suitable components in any suitable arrangement. As an example and not by way of limitation, computer system 1300 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 1300 may include one or more computer systems 1300; be unitary or distributed, span multiple locations, machines, or data centers; or reside in a cloud, which may include one or more cloud components in one or more networks. Where appropriate, computer system(s) 1300 may perform, at different times or at different locations, in real time or in batch mode, one or more steps of one or more methods described or illustrated herein.

Processor 1302 may include hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. Processor 1302 may include one or more internal caches for data, instructions, or addresses.

In particular embodiments, memory 1304 includes main memory for storing instructions for processor 1302 to execute or data for processor 1302 to operate on. In particular embodiments, one or more memory management units (MMUs) reside between processor 1302 and memory 1304 and facilitate accesses to memory 1304 requested by processor 1302. In particular embodiments, memory 1304 includes random access memory (RAM). This disclosure contemplates any suitable RAM.

In particular embodiments, storage 1306 includes mass storage for data or instructions. As an example and not by way of limitation, storage 1306 may include a removable disk drive, flash memory, an optical disc, a magneto-optical disc, magnetic tape, or a Universal Serial Bus (USB) drive or two or more of these. Storage 1306 may include removable or fixed media and may be internal or external to computer system 1300. Storage 1306 may include any suitable form of non-volatile, solid-state memory or read-only memory (ROM).

In particular embodiments, I/O interface 1308 includes hardware, software, or both, providing one or more interfaces for communication between computer system 1300 and one or more input and/or output (I/O) devices. Computer system 1300 may be communicably connected to one or more of these I/O devices, which may be incorporated into, plugged into, paired with, or otherwise communicably connected to vehicle 1100 (e.g., through the TCM ECU). An input device may include any suitable device for converting volitional user input into digital signals that can be processed by computer system 1300, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 1110 described above. An output device may include devices designed to receive digital signals from computer system 1300 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 1308 for them. I/O interface 1308 may include one or more I/O interfaces 1308, where appropriate.

In particular embodiments, communication interface 1310 includes hardware, software, or both providing one or more interfaces for data communication between computer system 1300 and one or more other computer systems 1300 or one or more networks. Communication interface 1310 may include one or more interfaces to a controller area network (CAN) or to a local interconnect network (LIN). Communication interface 1310 may include one or more of a serial peripheral interface (SPI) or an isolated serial peripheral interface (isoSPI). In some embodiments, communication interface 1310 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 1312 includes hardware, software, or both coupling components of computer system 1300 to each other. Bus 1312 may include any suitable bus, as well as one or more buses 1312, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 13B illustrates example firmware 1350 for a vehicle ECU 1300 as described with respect to control system 1130. Firmware 1350 may include functions 1352 for analyzing sensor data based on signals received from sensors 1110 or cameras 1120 received through communication interface 1310. Firmware 1350 may include functions 1354 for processing user input (e.g., directly provided by a driver of or passenger in vehicle 1100, or provided through a computing device 1150) received through I/O interface 1308. Firmware 1350 may include functions 1356 for logging detected events (which may be stored in storage 1306 or uploaded to the cloud), as well as functions for reporting detected events (e.g., to a driver or passenger of the vehicle through an instrument display or interactive interface of the vehicle, or to a vehicle manufacturer, service provider, or third party through communication interface 1310). Firmware 1350 may include functions 1358 for assessing safety parameters (e.g., monitoring the temperature of a vehicle battery or the distance between vehicle 1100 and nearby vehicles). Firmware 1350 may include functions 1360 for transmitting control signals to components of vehicle 1100, including other vehicle ECUs 1300.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. It should also be understood that as used in the description herein and throughout the claims that follow, the meaning of "a," "an," and "the" includes "one" and "more than one" unless the context clearly dictates otherwise.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. An apparatus, comprising:
a crossbar comprising a plurality of light sources; and
a controller configured to:
  determine a sequence of a vehicle;
  in response to determining the sequence, determine whether the sequence is restricted;
  in response to determining the sequence is not restricted, permit causing a light source from the plurality of light sources to perform an action;
  in response to determining the sequence is restricted and a restriction criteria is met, permit causing the light source from the plurality of light sources to perform the action; and
  in response to determining the sequence is restricted and a restriction criteria is not met, forgo causing the light source from the plurality of light sources to perform the action.

2. The apparatus of claim 1, wherein
the sequence comprises a vehicle braking sequence, and wherein
the controller is configured to:
  in response to determining the vehicle braking sequence, cause a first light source on a back side of the crossbar to generate a red light and cause a second light source on a front side of the crossbar to generate a white light.

3. The apparatus of claim 1, wherein
the sequence comprises a vehicle turn sequence, and wherein
the controller is configured to:
in response to determining the vehicle turn sequence, cause a light source on a lateral end of the crossbar to generate a periodic yellow light.

4. The apparatus of claim 1, wherein
the crossbar comprises an accessory insertion port, wherein
the sequence comprises an accessory insertion sequence, and wherein
the controller is configured to:
in response to determining the accessory insertion sequence, cause a light source of the plurality of light sources to generate a light, wherein the light source is associated with the accessory insertion port.

5. The apparatus of claim 1, wherein
the sequence comprises a chase sequence, and wherein
the controller is configured to:
in response to determining the chase sequence, cause a first light source of the plurality of light sources to generate a white light and cause second and third light sources of the plurality of light sources to generate yellow light, wherein the first light source is positioned between the second and third light sources.

6. The apparatus of claim 1, wherein
the sequence comprises a vehicle unlock sequence, and wherein
the controller is configured to:
in response to determining the vehicle unlock sequence, cause a first light source of the plurality of light sources to generate a white light and subsequently cause second and third sources of the plurality of light sources to generate a white light, wherein the first light source is positioned between the second and third light sources.

7. The apparatus of claim 1, wherein
the sequence comprises a follow sequence, and wherein
the controller is configured to:
in response to determining the follow sequence, cause a first light source on the back side of the crossbar to generate a yellow light and cause second and third light sources on the back side of the crossbar to generate yellow light, wherein the first light source is positioned between the second and third light sources.

8. The apparatus of claim 1, wherein
the sequence comprises a lock sequence, and wherein
the controller is configured to:
in response to determining the lock sequence, cause light sources on the back side of the crossbar to generate a light at a first intensity and subsequently cause the light sources on the back side of the crossbar to generate a light at a second intensity, the first intensity greater than the second intensity.

9. The apparatus of claim 1, wherein the plurality of light sources comprise a forward facing light source, a rear facing light source, a lateral end light source, and a bottom surface light source.

10. The apparatus of claim 1, the crossbar further comprising at least one of an electrical connection and a mount for coupling the crossbar to the vehicle.

11. The apparatus of claim 10, wherein the crossbar comprises the mount and the electrical connection, and wherein the mount comprises the electrical connection.

12. The apparatus of claim 1, further comprising a user interface configured to receive a user-originated sequence, wherein determining the sequence comprises determining the user-originated sequence.

13. The apparatus of claim 1 wherein the crossbar comprises an aluminum extrusion.

14. A computer-readable non-transitory storage media embodying software comprising instructions operable when executed to perform operations comprising:
determine a sequence of a vehicle;
in response to determining the sequence, determine whether the sequence is restricted;
in response to determining the sequence is not restricted, permit causing a light source from a plurality of light sources of a crossbar to perform an action;
in response to determining the sequence is restricted and a restriction criteria is met, permit causing the light source from the plurality of light sources to perform the action; and
in response to determining the sequence is restricted and a restriction criteria is not met, forgo causing the light source from the plurality of light sources to perform the action.

15. The media of claim 14, wherein determining the sequence of the vehicle comprises determining a user-originated sequence.

16. A vehicle comprising:
a crossbar mounted to the vehicle, wherein the crossbar comprises a plurality of light sources; and
a control system comprising a processor and a memory comprising instructions executable by the processor, the processor operable to execute the instructions to perform operations comprising:
determine a sequence of the vehicle;
in response to determining the sequence, determine whether the sequence is restricted;
in response to determining the sequence is not restricted, permit causing a light source from the plurality of light sources to perform an action;
in response to determining the sequence is restricted and a restriction criteria is met, permit causing the light source from the plurality of light sources to perform the action; and
in response to determining the sequence is restricted and a restriction criteria is not met, forgo causing the light source from the plurality of light sources to perform the action.

17. The vehicle of claim 16, wherein the crossbar comprise a top surface and a bottom surface, wherein the plurality of light sources comprise light sources positioned in the bottom surface, and wherein the light sources positioned in the bottom surface are configured to illuminate a non-vehicle area.

18. The vehicle of claim 16, wherein the crossbar is configured to support a load when mounted on the vehicle.

19. The apparatus of claim 1, wherein the controller is configured to:
determine an orientation of the crossbar, wherein the light source of the plurality of light sources performs the action based on the determined orientation of the crossbar.

20. The media of claim 14, wherein the operations further comprise:

determine an orientation of the crossbar, wherein the light source of the plurality of light sources performs the action based on the determined orientation of the crossbar.

21. The vehicle of claim 16, wherein the operations further comprise:
determine an orientation of the crossbar, wherein the light source of the plurality of light sources performs the action based on the determined orientation of the crossbar.

* * * * *